United States Patent
Sayama et al.

(10) Patent No.: US 7,343,509 B2
(45) Date of Patent: Mar. 11, 2008

(54) CAR-MOUNTED ELECTRONIC CONTROL DEVICE

(75) Inventors: Masahiko Sayama, Hyogo (JP); Shozo Kanzaki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 491 days.

(21) Appl. No.: 10/953,918

(22) Filed: Sep. 30, 2004

(65) Prior Publication Data
US 2005/0228562 A1    Oct. 13, 2005

(30) Foreign Application Priority Data
Apr. 12, 2004    (JP)    ............................ P2004-117053

(51) Int. Cl.
G06F 7/00    (2006.01)
H04N 9/89    (2006.01)
(52) U.S. Cl. ..................... 713/500; 701/36; 307/11; 307/43
(58) Field of Classification Search ............. 701/36; 713/500
See application file for complete search history.

(56) References Cited
U.S. PATENT DOCUMENTS
7,154,194 B2 * 12/2006 Sayama ..................... 307/43

7,155,323 B2 * 12/2006 Ishida ........................ 701/36
2002/0002429 A1 * 1/2002 Sugimura et al. ........... 701/29
2002/0013655 A1 * 1/2002 Amano et al. .............. 701/112
2002/0169524 A1 * 11/2002 Nakamoto et al. ........... 701/1
2003/0093189 A1 * 5/2003 Honda ......................... 701/1
2005/0216135 A1 * 9/2005 Sayama et al. ............... 701/1

FOREIGN PATENT DOCUMENTS

| JP | 4-197853 A | 7/1992 |
| JP | 5-18315 A | 1/1993 |
| JP | 11-338572 A | 12/1999 |
| JP | 2003-315474 A | 11/2003 |

* cited by examiner

Primary Examiner—Thuan N. Du
Assistant Examiner—Fahmida Rahman
(74) Attorney, Agent, or Firm—Sughrue Mion, PLLC

(57) ABSTRACT

The car-mounted electronic control device is constructed to include a main control circuit unit to be powered with a car-mounted battery through a switching element and a main power source circuit, and a starting timer circuit unit powered at all times through an auxiliary power source circuit. The timer circuit unit is provided with a sub CPU for acting in synchronism with a high-speed clock signal, and a timing counter for counting the frequency-divided signal of a low-speed clock signal. When a power source switch is opened to interrupt a switching element, the timer circuit unit measures a target awakening time periodically by contrasting the period of the low-speed clock signal to the period of the high-speed clock signal.

14 Claims, 14 Drawing Sheets

FIG. 4A   ESTIMATION OF HIGH-SPEED CLOCK PERIOD Th
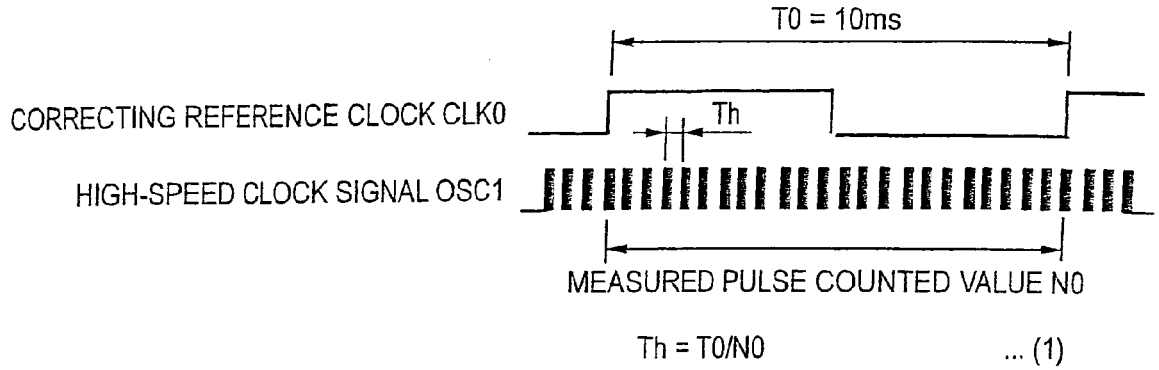
$$Th = T0/N0 \quad \ldots (1)$$
FIG. 4B   ESTIMATION OF LOW-SPEED CLOCK PERIOD Ts
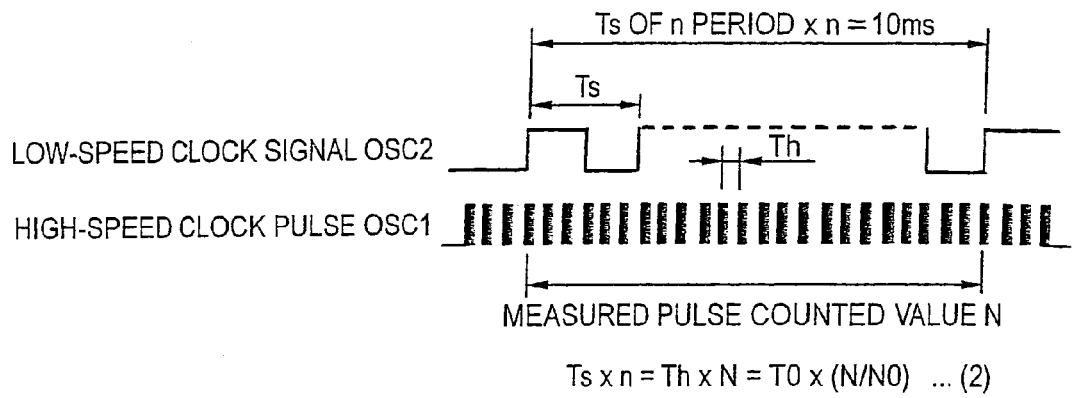
$$Ts \times n = Th \times N = T0 \times (N/N0) \quad \ldots (2)$$
FIG. 4C   GENERATION OF COUNTED FIRST SIGNAL
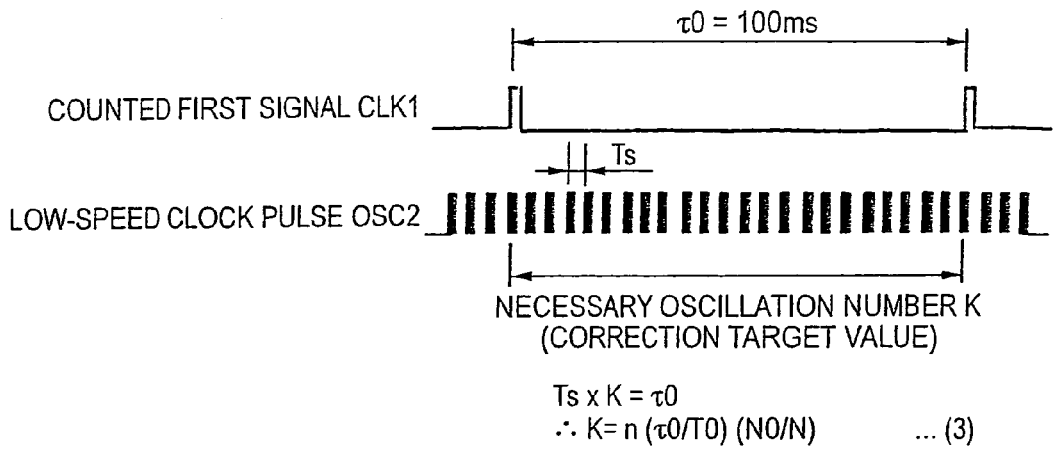
$$Ts \times K = \tau 0$$
$$\therefore K = n\,(\tau 0/T0)\,(N0/N) \quad \ldots (3)$$

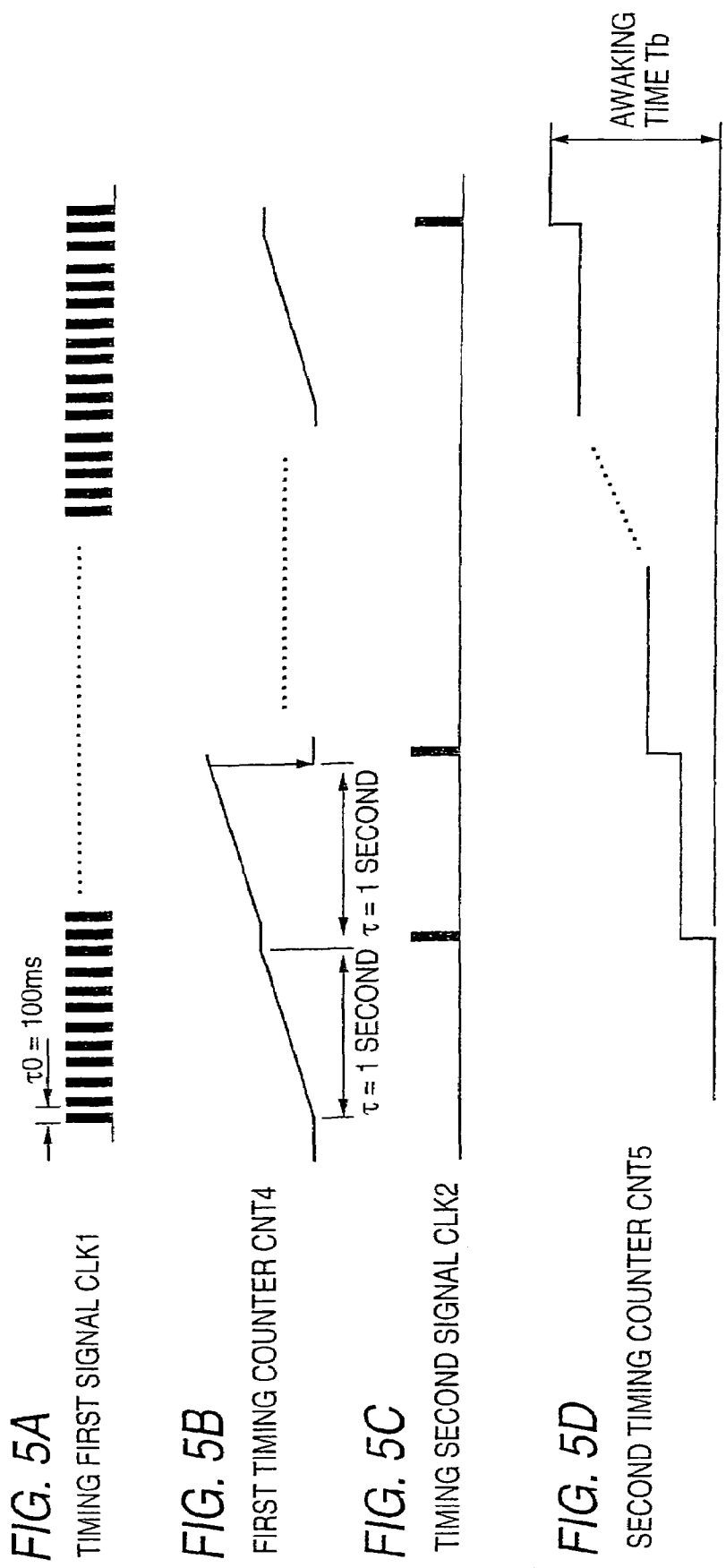

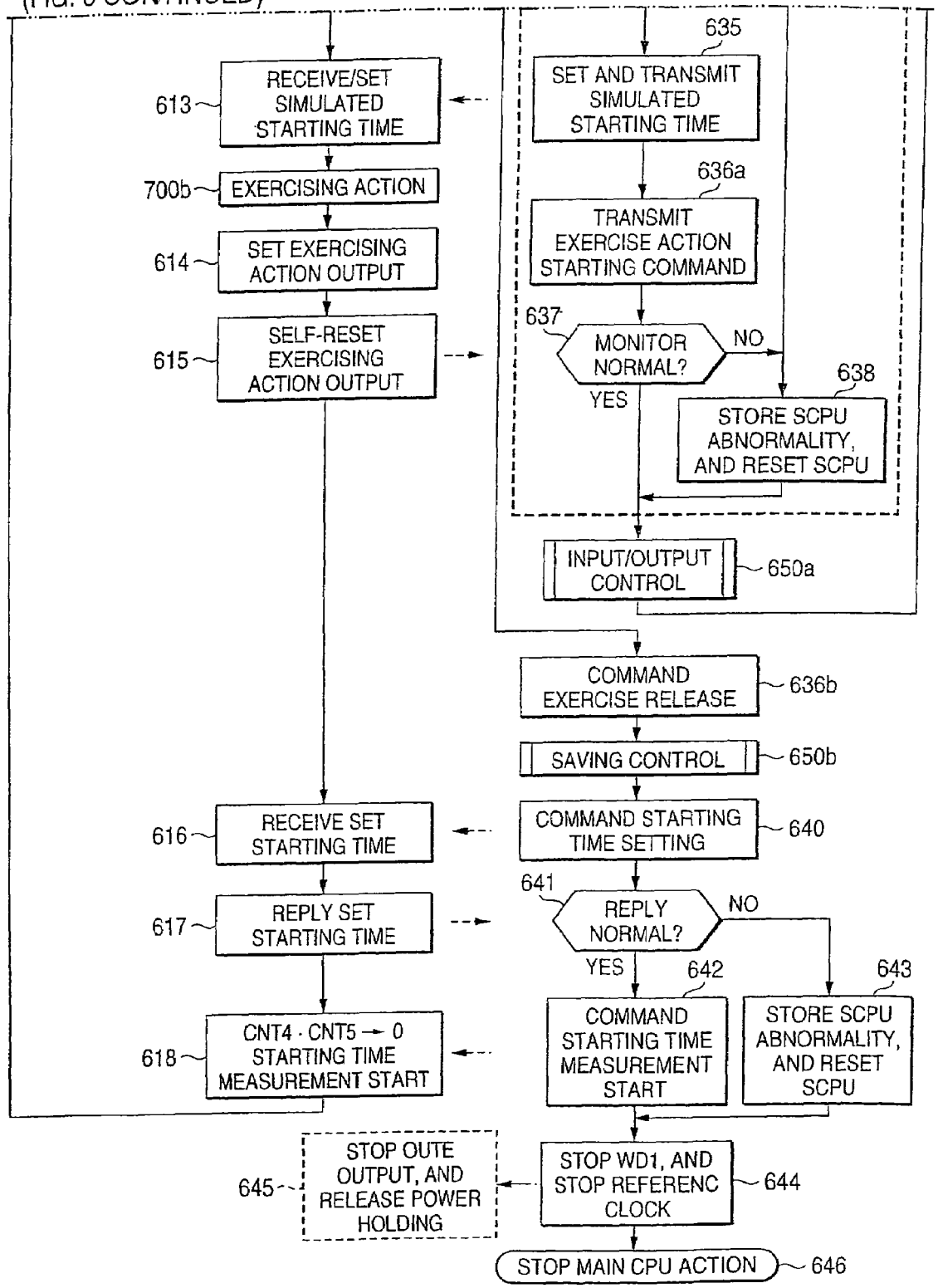

CAR-MOUNTED ELECTRONIC CONTROL DEVICE

BACKGROUND OF THE INVENTION

1. Field of the Invention

The present invention relates to a car-mounted electronic control device, in particular, to improvements in a starting control for measuring a target awakening time so as to prevent a preheat control of cooling water or a detection of evaporation of a fuel from being left for a long time, and more particularly, to a car-mounted electronic control device capable of making a start control with a low power consumption, in a high precision and at a low cost.

2. Description of the Related Art

In the related art, there is well known a car-mounted electronic control device which comprises: a main control circuit unit including a microprocessor to become a main CPU powered by a car-mounted battery through a switching element responding to the action of a power source switch and a main power source circuit, for driving various electric loads in response to the action states of various input sensors and the contents of a first program memory; and a timer circuit unit powered at all times by the car-mounted battery through an auxiliary power source circuit, for measuring the lapse time after the engine was stopped, so that it may generate starting output signals, when the measured time reaches a predetermined target measurement time, to connect the main power source circuit with the car-mounted battery.

According to Patent Document 1, Japanese Patent Publication JA-A-2003-315474 "Electronic Control Device and Semiconductor Integrated Circuit", for example, the concept of a soak timer of a wide variety of specifications for measuring the left time at a measurement time and a measurement precision according to applications have been presented on the soak timer for detecting the left time on the preheat control of cooling water or the detection of evaporation of a fuel.

According to Patent Document 2, Japanese Patent Publication JP-A-11-338572 "Clock Generator", moreover, there has also been presented the concept of using a ring oscillator as a high-speed oscillator in a mobile telephone having a low-speed oscillator to be used in a low power consumption mode and the high-speed oscillator to be used in an ordinary operation mode. In addition, the concept of cumulatively correcting the oscillation frequency of the ring oscillator comparing the oscillation frequency of the low-speed oscillator, as well as the operation principle of the ring oscillator have also been described in Patent Document 2.

(1) Description of Problems of the Related Art

The electronic control device according to Patent Document 1 is provided with a highly precise external oscillator, and a reference clock is generated on the basis of the oscillatory signal of the oscillator. The left time is measured by counting the reference clock signal. The external oscillator, however, increases the power consumption and the number of parts, causing the electronic control device to be a high price.

On the other hand, the electronic control device according to Patent Document 2 needs a highly precise oscillator as the low-speed oscillator, and the oscillation frequency itself of the high-speed oscillator must be adjusted. Therefore, the clock generator causes a complicate and expensive construction just for a timing application.

SUMMARY OF THE INVENTION (2) Description of the Objects of the Invention

A first object of the invention is to provide a car-mounted electronic control device, which has a low cost and a low power consumption and which has a timer starting function to suppress the discharge of the battery.

A second object of the invention is to provide a car-mounted electronic control device, which can have a highly precise measuring time for a long target measuring time to be accompanied by an environmental temperature change.

A third object of the invention is to provide a car-mounted electronic control device, which has diagnosing and inspecting functions added to improve the safety required of the timer starting operation in an unmanned state.

According to the invention, there is provided a car-mounted electronic control device comprising: a main control circuit unit including a microprocessor to become a main CPU powered by a car-mounted battery through a switching element responding to the action of a power source switch and a main power source circuit, for driving various electric loads in response to the action states of various input sensors and the contents of a first program memory; and a timer circuit unit powered at all times by the car-mounted battery through an auxiliary power source circuit, for measuring the lapse time from the time measurement starting command of the main CPU, to generate starting output signals, when a predetermined target measurement time is reached, and to feed the main power source circuit with the car-mounted battery thereby to start and activate the main CPU, wherein the timer circuit unit includes:

a microprocessor to become a sub CPU acting synergistically with a second program memory and in synchronism with a high-speed clock signal generated by a first oscillator;

timing counters for counting the number of low-speed clock signals generated by a second oscillator, to measure the lapse time after the main power source circuit was interrupted;

first estimation means for estimating the pulse period of the high-speed clock signal by receiving a correcting reference clock having a period divided or multiplied from the reference oscillator output signal for driving the main CPU, when the main CPU is active, and by counting the generated pulses of the high-speed clock signal with a first counter for a predetermined measurement period of the correcting reference clock;

second estimation means for estimating the period of the low-speed clock signal by counting the generated pulses of the high-speed clock signal with a second counter for a frequency-divided pulse period of the low-speed clock signal when the main CPU is inactive; and periodic correction means for cumulatively correcting the current values of the timing counters and the timing lapse time in accordance with the period of the low-speed clock signal sequentially updated and estimated by executing the period estimation of the low-speed clock signal periodically with the second estimation means.

In the car-mounted electronic control device thus far described according to the invention, the pulse period of the high-speed clock signal by the first oscillator is estimated during the action of the main CPU with reference the multiplied/divided pulse period of the highly precise reference clock for driving the main CPU. Of the individual dispersion fluctuation and the environmental temperature characteristic fluctuation of the first oscillator, it is possible to eliminate the influences of the individual dispersion fluctuation.

Moreover, the pulse period of the low-speed clock signal by the second oscillator is periodically estimated with reference to the pulse period of the high-speed clock signal after the actions top of the main CPU. It is, therefore, possible to eliminate the influences of the individual dispersion fluctuation of the second oscillator and the environmental temperature characteristic fluctuation.

The timing counter corrects the lapse time cumulatively according to the value of the period of the low-speed clock signal sequentially updated and estimated. Against the long left time for which the environmental temperature seriously changes, even the inexpensive oscillator of the low-speed clock signal of low precision period can acquire a relatively highly precise measurement time, which is determined by the environment temperature corresponding precision of the high-speed clock signal.

In the state where the main power source circuit is interrupted so that the main control circuit unit stops its action, moreover, the first oscillator and the sub CPU stops their actions for most time although they are intermittently started periodically for an extremely short time, so that the power consumption of the timer circuit unit can be reduced to suppress the discharge of the car-mounted battery.

BRIEF DESCRIPTION OF THE DRAWINGS

FIGS. 4A, 4B and 4C are explanatory diagrams of relations among various clock signals of the device of FIG. 1;

FIGS. 5A, 5B, 5C and 5D are explanatory diagrams of the actions of a timing counter of the device of FIG. 1;

DESCRIPTION OF THE PREFERRED EMBODIMENTS

Embodiment 1 of the Invention

Figure 1:
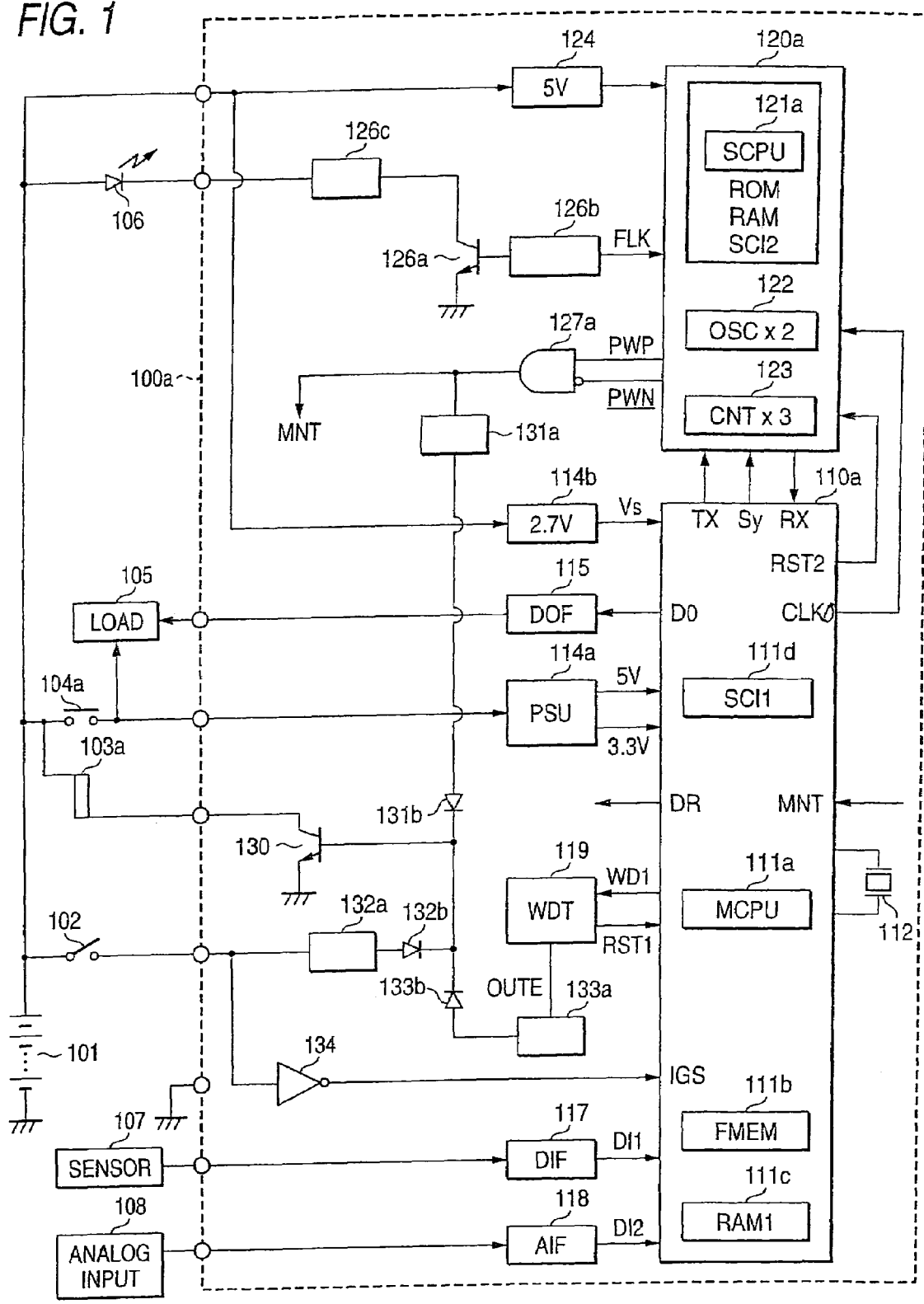
FIG. 1 is an entire construction diagram of an electronic control device according to a first embodiment of the invention.

FIG. 1 showing the entire construction diagram of the electronic control device according to the first embodiment of the invention will be described in the following. In FIG. 1, a car-mounted electronic control device 100a is mainly constructed of a main control circuit unit 110a and a timer circuit unit 120a, and is housed in the not-shown sealed housing. External devices to be connected with the car-mounted electronic control device 100a include a car-mounted battery 101, a power source switch 102, an electromagnetic coil 103a to act as a power source relay, a switching element 104a or an output contact of the electromagnetic coil 103a, various electric loads 105 such as a display device or an actuator, various input sensors 107 including various operation switches for ON/OFF operations, an analog input sensor 108, and a display device 106 of a light emitting diode. The main control circuit unit 110a is constructed to include a main CPU 111a such as a microprocessor, a first program memory 111b such as a nonvolatile flash memory, an operation processing RAM memory 111c, and a series-parallel converter 111d.

The main CPU 111a acts in synchronism with a reference clock signal by a reference oscillator 112 using a quartz oscillator or a ceramic oscillator, and the frequency-divided signal of the reference clock signal is fed as a correcting reference clock signal CLK0 to the timer circuit unit 120a. A main power source circuit 114a is supplied with the electric power from the car-mounted battery 101 through the switching element 104a, and feeds a stable voltage such as DC 5 V or DC 3.3 V to the main control circuit unit 110a.

Here, the main control circuit unit 110a is provided with a sleep power source circuit 114b to act as a backup power source for the RAM memory 111c. The power source circuit 114b is fed with the electric power not through the switching element 104a but directly through the car-mounted battery 101, but its power consumption takes a minute value.

An output interface circuit 115 is interposed between the output port DO of the main CPU 111a and the various electric loads 105, and includes an output latch memory and a multiplicity of output transistors. When any of these output transistors becomes conductive, that one of the electric loads 105, which is connected with the conductive transistor, is driven by the electric power fed from the car-mounted battery 101 through the switching element 104a.

An input interface circuit 117 is connected between the various input sensors 107 and an input port DI1 of the main CPU 111a, and includes a noise filter and a data selector.

An analog input interface circuit 118 includes a noise filter and a multi-channel AD converter, and the digital converted values of the various analog input signals are connected with an input port DI2 of the main CPU 111a.

A watch dog timer circuit 119 watches the pulse width of a watch dog clear signal WD1 or a pulse train generated by the main CPU 111a. The watch dog timer circuit 119 generates a reset pulse signal RST1 to reset and restart the main CPU 111a, when that pulse width becomes a predetermined or larger value. When the watch dog clear signal WD1 is a normal pulse train, the watch dog timer circuit 119 sets the logic level of an output permitting signal OUTE to "H".

The timer circuit unit 120a is constructed, as will be described in detail with reference to FIGS. 2A to 2F, to include a sub CPU 121a of low speed and low power consumption, two high- and low-speed oscillators 122 constructed of a ring oscillator, and three hardware counters 123. An auxiliary power source circuit 124 is supplied with the electric power directly from the car-mounted battery 101, and feeds the timer circuit unit 120a at all times with a stable voltage such as DC 5 V.

A transistor 126a is rendered conductive and driven by a flashing display output FLK generated by the sub CPU 121a, through a drive resistor 126b connected with a base circuit, to drive the display element 106 to flash through a current limiting resistor 126c connected with a collector circuit.

A logical element 127a generates a closed circuit driving output signal having the logic level "H", only when a positive starting output signal PWP generated by the sub CPU 121*a* takes the logic level "H" and when a negative starting output signal PWN generated by the sub CPU 121*a* takes a logic level "L". The closed drive output signal is fed as a monitor input signal MNT to the main CPU 111*a*. A transistor 130 is connected with the other end of the electromagnetic coil 103*a* of a power source relay, one end of which is connected with the positive terminal of the car-mounted battery 101. When the power source switch 102 is closed, the transistor 130 is rendered conductive and driven through a series circuit of a drive resistor 132*a* and a diode 132*b*, to energize the electromagnetic coil 103*a* thereby to render the switching element 104*a* or an output contact conductive.

Moreover, the transistor 130 is rendered conductive and driven through a series circuit of a drive resistor 133*a* and a diode 133*b* by the output permitting signal OUTE, which is generated by the watch dog timer circuit 119 when the switching element 104*a* becomes conductive so that the main CPU 111*a* starts its action. Once the main CPU 111*a* starts its action, the switching element 104*a* acts to hold itself even if the power source switch 102 is opened.

An interface element 134 is connected to input an inverted logic signal IGS to the main CPU 111*a* in response to the switching action of the power source switch 102. When the main CPU 111*a* detects that the power source switch 102 has been opened, it performs the origin restoring action of the actuator, the later-described preparing action on the timer circuit 120*a*, the saving processing of memory information and so on, and stops the generation of the watch dog clear signal WD1.

As a result, the logic level of the output permitting signal OUTE of the watch dog timer circuit 119 takes the logic level "L" so that the transistor 130 becomes inconductive to interrupt the switching element 104*a*.

Here, the output permitting signal OUTE by the watch dog timer circuit 119 may be replaced by a self-holding drive signal DR, which is generated by the main CPU 111*a*.

Moreover, the transistor 130 is rendered conductive and driven through a series circuit of a drive resistor 131*a* and a diode 131*b* by the output of the logical element 127*a*. When the timer circuit 120*a* generates the starting output signal PWP at the logic level "H" and the starting output signal PWN at the logic level "L", the transistor 130 becomes conductive so that the switching element 104*a* is closed to start the main CPU 111*a*.

When the main CPU 111*a* is started, the starting output signal of the timer circuit unit 120*a* stops. In place of the starting output signal, either the output permitting signal OUTE, which is effective when the generation period of the watch dog clear signal generated by the main CPU 111*a* is a predetermined or shorter time, or the self-holding drive signal DR, which is generated by the main CPU 111*a*, keeps the action of the power source relay.

Even after the start of the main CPU 111*a*, however, the starting output signal may be continuously generated, and its output may be stopped by the main CPU 111*a* as the starting operation ends.

Figure 2:
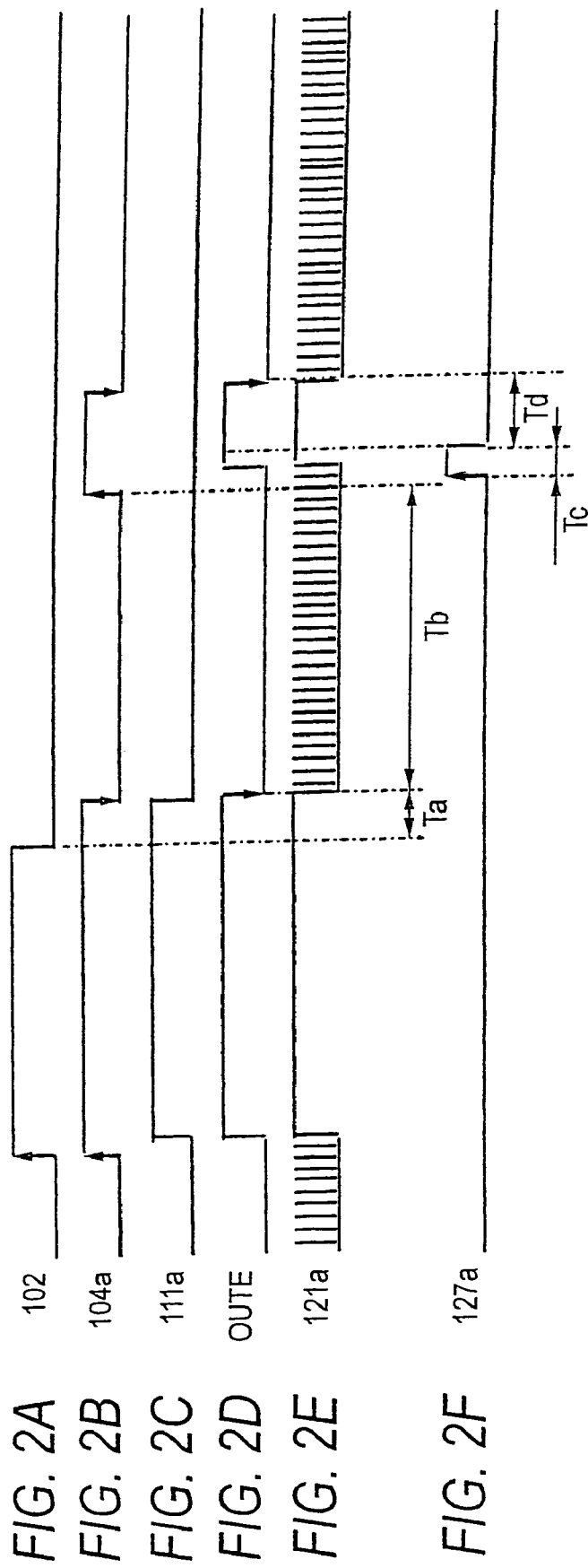
FIGS. 2A to 2F are action time charts of a power source circuit of the device of FIG. 1.

In FIGS. 2A to 2F presenting action time charts of the power source circuit of FIG. 1, as the power source switch 102 is closed (to the logic level "H"), as shown in FIG. 2A, the switching element 104*a* is closed (to the logic level "H"), as shown in FIG. 2B, so that the main CPU 111*a* starts its action, as shown in FIG. 2C.

As a result, the watch dog clear signal WD1 of the pulse train is generated by the main CPU 111*a*, and the watch dog timer circuit 119 outputs the output permitting signal OUTE. For the period while the main CPU 111*a* is being energized, the sub CPU 121*a* acts in synchronism with the later-described high-speed clock signal, as shown in FIG. 2E.

Here, the sub CPU 121*a* is interruptedly started periodically to repeat the actions for an extremely short time, even for the period while the main CPU 111*a* stops its action, as will be described hereinafter.

When the power source switch 102 is opened, the main CPU 111*a* stops its action after a saving operation period Ta. The watch dog clear signal WD1 is stopped so that the output permitting signal OUTE is also stopped. The switching element 104*a* is opened to interrupt the power source to the main CPU 111*a*, but the sub CPU 121*a* is powered at all times by the auxiliary power source circuit 124 to establish an intermitting action mode. For the saving operation period Ta, the car-mounted electronic control device executes the various saving operations needed for itself, such as the origin restoring action of the actuator or the storage of the not-shown nonvolatile data memory with the various pieces of learning information or abnormal hysteresis information stored in the first RAM memory 111*c*, in accordance with the contents of the first program memory 111*b*, and transmits a next target measurement time to the timer circuit unit 120*a*, thereby to generate a starting command of a timer measurement.

When the timer circuit unit 120*a* generates the positive/negative starting output signals PWP/PWN before long, as shown in FIG. 2F, the logical element 127*a* takes the output logic level "H" so that the transistor 130 becomes conductive to close the switching element 104*a*.

As a result, the main CPU 111*a* is started to generate the output permitting signal OUTE thereby to keep the conduction of the transistor 130, and the starting output signal is stopped in response to the command coming from the main CPU 111*a*.

When the starting operation is completed for a period Td, the main CPU 111*a* stops its action so that the output permitting signal OUTE is stopped to interrupt the switching element 104*a*.

If the main CPU 111*a* starts a next starting command for the starting operation period Td, similar starting actions are performed before long. Unless the next starting command is given, the main CPU 111*a* is not started again.

Figure 3:
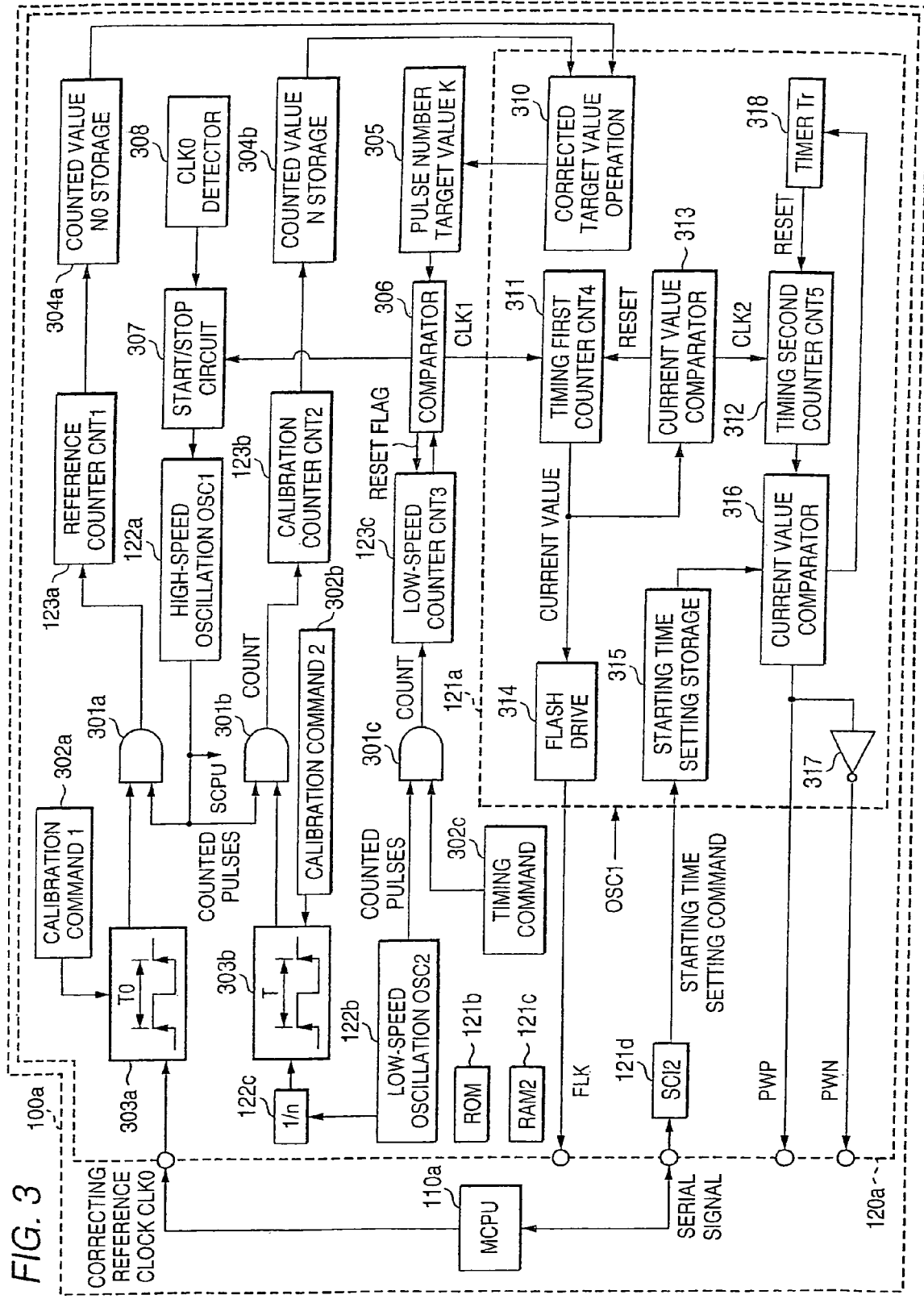
FIG. 3 is a control block diagram of a timer circuit unit of the device of FIG. 1.

Next, the timer circuit unit 120*a* of FIG. 1 will be described on its construction and actions in FIG. 3 presenting the control block diagram thereof with reference to the time charts presented in FIGS. 4A to 4C and FIGS. 5A to 5D.

In FIG. 3, a gate element 301*a* is connected at such a position as to feed high-speed clock pulses generated by a first oscillator 122*a*, to the counting input of a first counter 123*a*. When the later-described calibration command 302*a* arises, a measurement period setting circuit 303*a* sets the gate element 301*a* to the logic level "H" and opens it, for the measurement period T0 of one period or predetermined pulse periods such as 10 milliseconds of the correcting reference clock CLK0 generated by the main CPU 111*a*.

As a result, the first counter 123*a* counts the high-speed clock signals, and the current value at the instant when the measurement period setting circuit 303*a* closes the gate element 301*a* is stored as a counted value N0 in a measurement value storage memory 304*a*.

If the high-speed clock signal has a pulse period Th, this pulse period Th is calculated as the quotient of the division of the measurement period T0 of the correcting reference clock CLK0 by the counted value N0 of the first counter 123*a*, as expressed by Formula (1) of FIG. 4A.

Here, the precision of the periodic fluctuation of the correcting reference clock CLK0 is less than 1% at most, whereas the pulsating periodic fluctuation of the high-speed clock signal is at a level of ±10%. This fluctuation factors is due to the individual dispersion of the first oscillator 122a and the environmental temperature change.

The value of the high-speed clock signal pulse period Th by Formula (1) can be an estimated period reflecting at least the individual dispersion fluctuation although a problem that the value is changed by the environmental temperature at the point of measurement time is left unsolved.

A gate element 301b is connected at such a position as to feed the high-speed clock pulses generated by the first oscillator 122a, to the counting input of a second counter 123b. When the later-described calibration command 302b arises, a measurement period setting circuit 303b sets the gate element 301b to the logic level "H" and releases it, for the frequency-divided pulse period, which is obtained by dividing the low-speed clock signal by n-frequencies by a frequency-dividing circuit 122c, that is, for a measurement period T corresponding to about 10 milliseconds, for example.

The frequency division ratio n in the frequency dividing circuit 122c is used for equalizing the frequency-divided pulse period T substantially to a measurement period T0 of the correcting reference clock CLK0, but need not be strict for the equalization. As a result, the second counter 123b counts the high-speed clock signal, and the value of a counted value N at the instant when the measurement period setting circuit 303b closes the gate element 301b is stored in a measurement value storage memory 304b.

Here, if the low-speed clock signal has a pulse period Ts, this period Ts is calculated as the product of the measurement period T0 of the correcting reference clock CLK0 by the ratio between the counted value N and the counted value N0, as expressed by Formula (2) of FIG. 4B. Moreover, the periodic fluctuation of the low-speed clock signal is at a level of +50%, and it is caused by the individual dispersion of the second oscillator, 122b and the environmental temperature change.

Therefore, the calculation of the low-speed clock signal period Ts by Formula (2) is periodically executed to obtain the estimated period, which reflects the fluctuation of the environmental temperature at the point of measurement time and the individual dispersion fluctuation.

A gate element 301c is connected at such a position as to feed the low-speed clock pulses generated by the second oscillator 122b, to the counting input of a third counter 123c. When the later-described timing command 302c arises, the third counter 123c begins the counting of the low-speed clock signals generated by the second oscillator 122b.

A pulse number target value storage memory 305 is stored with a target value K, as expressed by Formula (3) of FIG. 4C.

This target value K is so variably set according to the value of the present period Ts that the product of the pulse period Ts of the low-speed clock signal and the target value K may be a first period τ0 or a predetermined timing unit. The first period τ0 is 0.1 seconds, for example. The target value K is periodically calculated by the later-described corrected target value operating means 310 of the sub CPU 121a.

A comparator circuit 306 compares the current value of the third counter 123c and the target value K stored in the pulse number target value storage memory 305. When these values are equal, the comparator circuit 306 generates a reset flag to reset the current value of the third counter 123c to 0, and generates a timing first signal CLK1 at an interval of the first period τ0.

Moreover, the comparator circuit 306 feeds the timing signal to a start/stop circuit 307 to act as high-speed clock stopping means thereby to start the first oscillator 122a intermittently at the later-described timing.

Moreover, a clock detector circuit 308 detects that the correcting reference clock signal CLK0 fed from the main CPU 111a is active, thereby to cause the first oscillator 122a continuously when the clock signal is turned ON/OFF.

The sub CPU 121a acts synergistically with a second program memory 121b or a nonvolatile memory such as a mask ROM memory and in synchronism with the high-speed clock signal generated by the first oscillator 122a, thereby to perform the operation processing while using a second operation processing RAM memory 121c.

A second series-parallel converter 121d constructs a serial communication circuit while pairing up with the first series-parallel converter 111d on the side of the main CPU 111a.

The corrected target value operating means 310 calculates the corrected target value K, as expressed by Formula (3) of FIG. 4C, periodically on the basis of the counted values N0 and N stored in the measured value storage memories 304a and 304b, and stores it in the pulse number target value storage memory 305.

A first timing counter 311 counts the counted first signal CLK1 generated by the comparator circuit 306, and a second timing counter 312 counts the counted second signal CLK2 generated by current value comparing means 313.

The actions of the current value comparing means 313 are illustrated in FIG. 5.

The timing first signal CLK1 shown in FIG. 5A is counted by the first timing counter 311, as shown in FIG. 5B. Each time the current value reaches a second period of τ=1 second corresponding to the tenth count, for example, the timing second signal CLK2 is generated, as shown in FIG. 5C. At the time of instant when the second timing second signal CLK2 is generated, the current value of the first timing counter 311 is reset to 0. On the other hand, the second timing counter 312 counts the timing second signal CLK2, as shown in FIG. 5D.

Flash drive means 314 to act as flash display output means drives the display element 106 (as referred to FIG. 1) to flash, when the current value of the first timing counter 311 is 1, but leaves it unflashing when the current value is 0 or 2 to 19. As a result, the intervals of flashing of 0.1 seconds and unflashing of 1.9 seconds are alternately repeated.

Here, the first timing counter 311 may also be reset for every seconds. In the state of this case, the ON/OFF ratio of the flashing drive output FLK cannot be made one tenth or less.

A starting time setting memory 315 is stored with a target measurement time, which comes from the main CPU 111a through the first/second series-parallel converter 111d/121d acting as a serial communication circuit.

Comparison decision output means 316 generates the starting output signal PWP, as shown in FIG. 5D, when the current value of the second timing counter 312 for counting the timing second signal CLK2 of pulses of an interval of 1 second exceeds a value corresponding to the target measurement time stored in the starting time setting memory 315.

On the other hand, logical inversion means 317 generates the starting output signal PWN of the logic inverse to the starting output signal PWP. A reset timer 318 resets the current value of the second timing counter 312, when a predetermined time Tr elapses after the comparison decision output means 316 generated the starting output signal PWP.

Here, the starting time setting memory 315 may be stored with a fixed constant, which is stored in and transferred from the second program memory 121b.

Here, the comparator circuit 306 acts to activate and drive the first oscillator 122a at the timing, with which the timing first signal CLK1 is generated in FIG. 4C, so that the first timing counter 311 is enabled to time by the sub CPU 121a. For the remaining most period, the first oscillator 122a and the sub CPU 121a are inactive.

The third counter 123c counts the low-speed clock signal by the second oscillator 122b for the period while the first oscillator 122a and the sub CPU 121a are inactive. Once of twenty (i.e., once for 2 seconds) of the timings generated by the timing first signal CLK1 in FIG. 4C, moreover, the first oscillator 122a is activated and driven to perform the measurement by the second counter 123b and to update the target value K by the corrected target value operating means 310.

Figure 6:
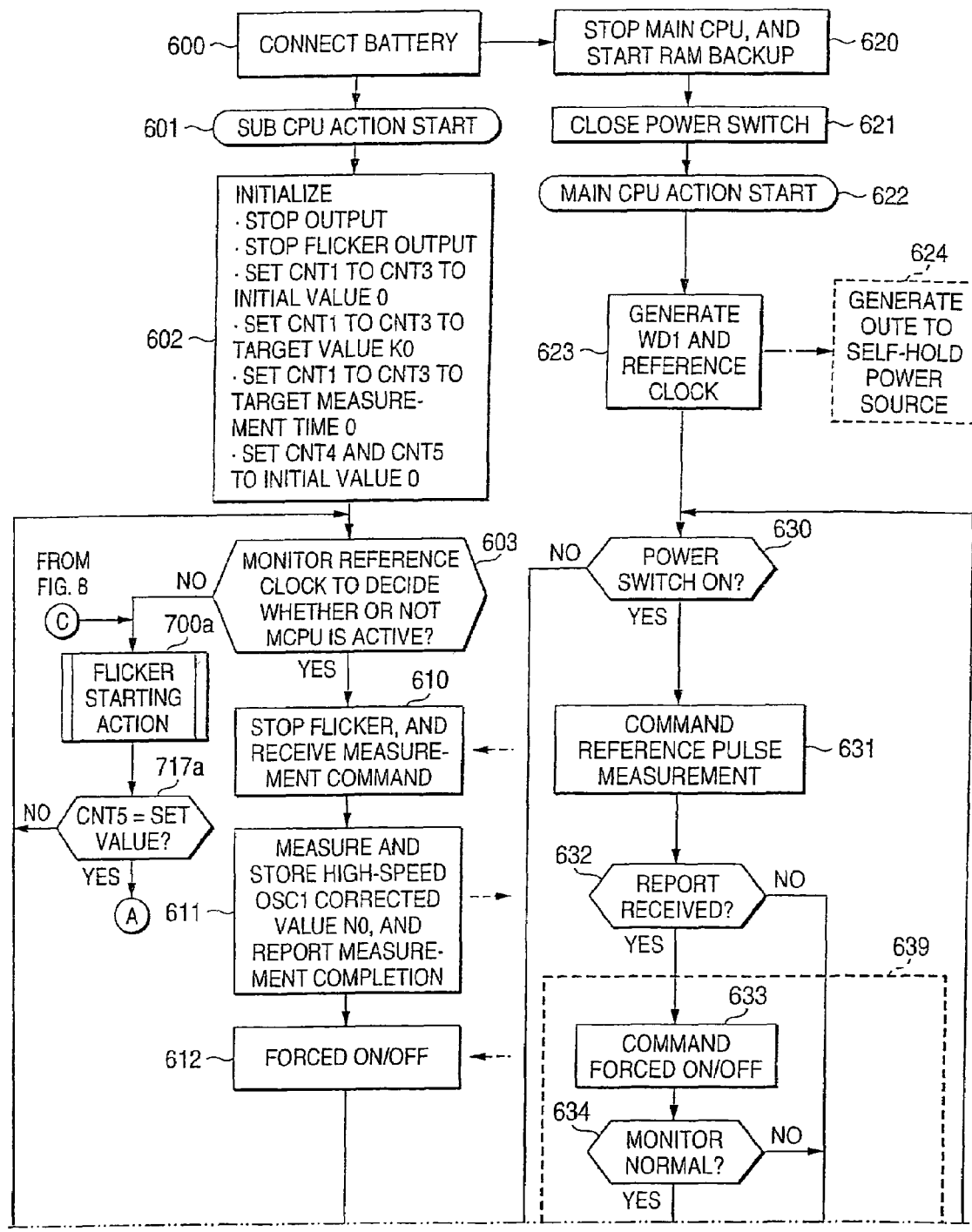
FIG. 6 is a flow chart for explaining the actions of a front half of the device of FIG. 1.

Next, the electronic control device of FIG. 1 will be described with reference to FIG. 6 presenting a flow chart for describing the actions of the front half.

When the car-mounted electronic control device 100a is connected at Step 600 with the car-mounted battery 101, the first oscillator 122a and the sub CPU 121a start their actions at Step 601. At subsequent Step 602, the sub CPU 121a is initialized. At this initializing Step 602, the logic level of the starting output signal PWP is set to "L", and the logic level of the starting output signal PWN is set to "H" thereby to bring the starting output signals into stop states. At the same time, the flashing display output FLK for driving the display element 106 also takes the logic level "L" to cause the lighting stop state.

Moreover, the first, second and third counters 123a, 123b and 123c are reset to the current value 0 by the not-shown reset signal output circuit.

Moreover, the pulse target value storage memory 305 is stored with a predetermined standard representative value K0 as the target value K, and the starting time setting memory 315 is stored with the initial value 0 indicating the start inactivation. On the other hand, the first and second timing counters 311 and 312 are also set to have the current value 0. Step 603 is activated after Step 602 to decide whether or not the correcting reference clock CLK0 is ON/OFF, thereby to decide whether or not the main CPU 111a is active. If the main CPU 111a is active, the routine transfers to Step 610. Otherwise, the routine transfers to Step 700a, as will be described with reference to FIG. 7A.

When the car-mounted electronic control device 100a is connected at Step 600 with the car-mounted battery 101, on the other hand, the first RAM memory 111c in the main control circuit unit 110a is backed up at Step 620 by the sleep power source circuit 114b. When the power source switch 102 is closed at Step 621, the switching element 104a is closed, and the main power source circuit 114a generates a constant voltage output so that the main CPU 111a starts its action.

As a result, at subsequent step 623, the watch dog clear signal WD1 arises to start generation of the correcting reference clock CLK0. As indicated by Block 624, the watch dog timer circuit 119 generates the output permitting signal OUTE to keep the transistor 130 conductive for closing and driving the switching element 104a.

At Step 630 subsequent to Step 623, it is decided whether or not the power source switch 102 closed at Step 621 is still closed. The routine transfers to Step 631, if the switch is closed, but to Step Block 650b via Step 636b if not.

Here, Step 636b indicates the exercise release command, which is generated by the main CPU 111a in case the power source switch 102 is opened within an exercise action time after the exercise action starting command was transmitted at later-described Step 636a so that the exercise action at Step Block 700b was started.

At Step 631, a command to measure the reference pulses is issued to the sub CPU 121a through the serial communication circuit. At Step 610, the flashing display output FLK is stopped accordingly as the power feeding state was confirmed at Step 603, and the reference pulse measurement command transmitted by the main CPU 111a was received at Step 631.

At subsequent Step 611, in response to the first calibration command 302a generated, as shown in FIG. 3, the first counter 123a measures the period of the correcting reference clock CLK0 and stores the counted value N0 in the measured value storage memory 304a.

When the storage of the counted value N0 is completed, the sub CPU 121a transmits the completion report to the main CPU 111a. Step 632 is activated subsequent to Step 631, to decide whether or not the report has been replied within the range of a predetermined time from the sub CPU 121a. The routine transfers to Step 638, if the report is delayed, but to Step 633 if the normal report is received.

At Step 633, the forced ON command and the forced OFF command of the starting output signal are issued to the sub CPU 121a through the serial communication circuit. At subsequent Step 634, it is decided by monitoring the signal level of the monitor input signal MNT whether or not the sub CPU 121a has forced the starting output signal ON and OFF. The routine transfers to Step 638, if the monitor result is abnormal, and to Step 635, if normal.

At Step 612 to be activated subsequent to Step 611, the logic levels of the starting output signals PWP and PWN are alternately inverted on the basis of the forced ON/OFF commands of Step 633 thereby to effect the forced ON or the forced OFF.

At Step 635, the exercising target measurement time of about several minutes is transmitted. At subsequent Step 636a, an exercise action starting command is transmitted. At subsequent Step 637, the signal level of the monitor input signal MNT is monitored to decide whether or not the sub CPU 121a has generated the starting output signal as the exercising action. The routine transfers to Step 638, if the monitor result is abnormal, but to Step Block 650a if normal.

At Step 613 subsequent to Step 612, the exercising target measurement time is stored in the starting time setting memory 315 of FIG. 3, and the timing command 302c is issued. At subsequent Step Block 700b, the starting control action to be described with reference to FIG. 7B is made. At subsequent Step 614, the exercising action output is outputted. At subsequent Step 615, the exercising action output is self-released after a predetermined time in a manner to correspond to the action of the reset timer 318 of FIG. 3.

At Step 638, it is stored as the hysteresis information in the first RAM memory 111c that an abnormality has occurred on the side of the sub CPU 121a. At the same time, a reset output pulse RST2 is generated to initialize/restart the sub CPU 121a, and the routine transfers to Step Block 650a.

Step Block 639 composed of Step 633 to Step 638 acts as monitor control means and is activated either once just after the power source switch 102 is closed by the not-shown bypass flow or once a period of several minutes.

At Step Block 650a, when the power source switch 102 is closed, the main CPU 111a controls the various electric loads 105 in accordance with the input information of the various input sensors 107 and the various analog input sensors 108 and the contents of the first program memory 111b. In the procedure of the input/output control, the routine returns at a proper time to Step 630, at which it is confirmed whether or not the power source switch 102 is opened.

If it is decided at Step 630 that the power source switch 102 is opened, the routine transfers through the aforementioned Step 636b to Step Block 650b, at which the saving control operation is performed. At subsequent Step 640, the setting of the next starting time is instructed. At subsequent Step 641, it is decided whether or not the starting time setting confirmation is replied from the sub CPU 121a. The routine transfers to Step 643, if the confirmation is not replied, but to Step 642 if the normal confirmation is replied.

At Step 642, the measurement starting command of the starting time is transmitted. At Step 643, it is stored as the hysteresis information in the first RAM memory 111c that an abnormality has occurred on the side of the sub CPU 121a. At the same time the reset output pulse RST2 is generated to initialize/restart the sub CPU 121a. In the not-shown flow, the operations of Step 640 and Step 641 are executed again.

At Step 616 subsequent to Step 615, the target measurement time commanded at Step 640 is stored in the starting time setting memory 315. At subsequent Step 617, the set starting time is confirmed and replied.

At subsequent Step 618, when the measurement starting command of the starting time at Step 642 is received, the current value of the first/second timing counter 311/312 of FIG. 3 is reset, and the timing command 302c is generated. Then, the routine returns and transfers to Step 603.

At Step 644 to be activated subsequent to Step 642 or Step 643, on the other hand, the main CPU 111a stops the pulse generation of the watch dog clear signal WD1. At subsequent Step 646, the action of the main CPU 111a is ended.

When the watch dog clear signal WD1 stops at Step 644, the watch dog timer circuit 119 stops the generation of the output permitting signal OUTE at Block 645 so that the transistor 130 becomes inconductive to open the switching element 104a thereby to stop the power feed to the main CPU 111a.

Figure 7A:
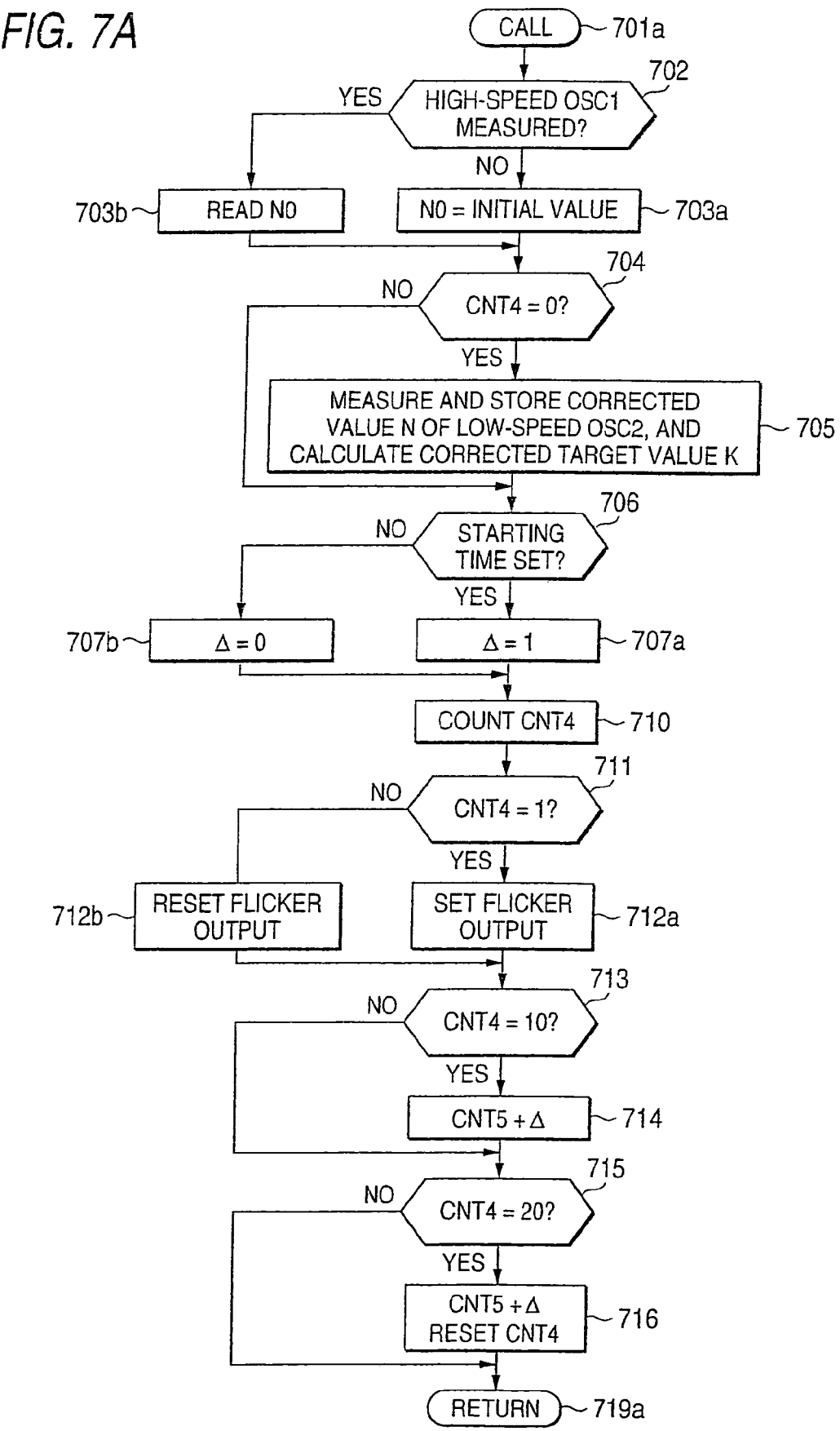
FIGS. 7A and 7B are flow charts for explaining the partial actions of FIG. 6.
Figure 7B:
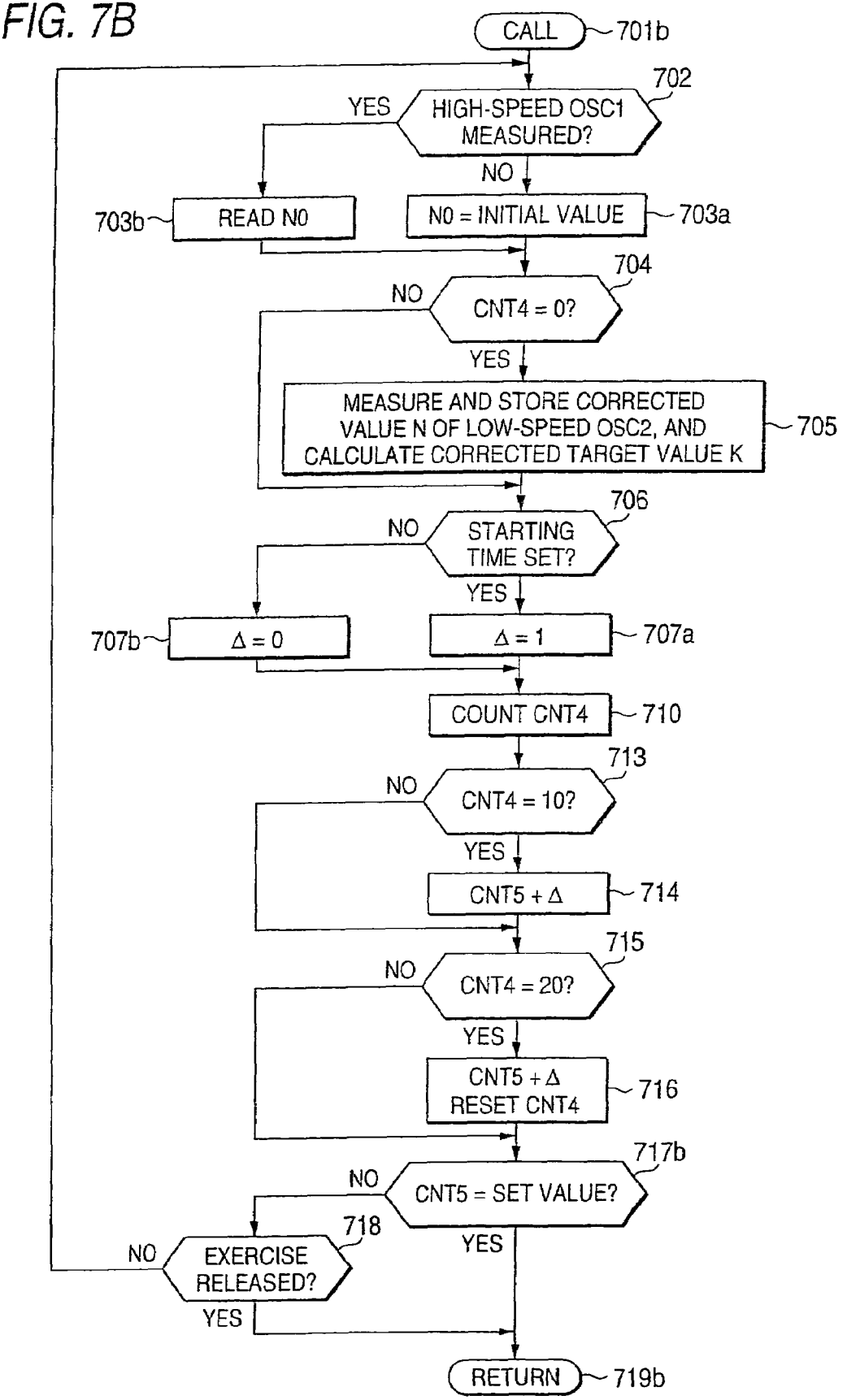

In FIG. 7A presenting a flow chart for explaining the actions of the portion of Step Block 700a of FIG. 6, Step 701a is a step of starting the actions of Step Block 700a of FIG. 6. At subsequent Step 702, it is decided whether or not the counted value N0 has already been measured at Step 611. The routine transfers to Step 703a, if the measurement is not completed yet, but to Step 703b if completed.

The initial value set as the counted value N0 at Step 602 is read at Step 703a, and the measured value measured as the measured value N0 at Step 611 and stored in the measured value storage memory 304a is read at Step 703b.

Subsequent to Step 703a or Step 703b, Step 704 is activated to decide whether or not the current value of the first timing counter 311 is at 0. The routine transfers to Step 706, if the current value is not at 0, but to Step 705 only if the current value is at 0.

The second calibration command 302b in FIG. 3 is generated at Step 705, and the second counter 123b counts the counted value N. When this value is stored in the counted value storage memory 304b, the corrected target value K is calculated on the basis of Formula (3) of FIG. 4C. This value is stored in the pulse target value storage memory 305, and the routine then transfers to Step 706.

At Step 706, it is decided whether or not the starting time setting memory 315 has been set with a numerical value other than the initial value 0. If already set, the routine transfers to Step 707a, at which an additional value of $\Delta=1$ is stored. Otherwise, the routine transfers to Step 707b, at which an additional value $\Delta$ of $\Delta=0$ is stored.

Here, this additional value decides whether or not the second timing counter 312 will perform the adding action. If the additional value is 0, no adding action is performed.

Subsequent to Step 707a or Step 707b, Step 710 is activated such that the first timing counter 311 awaits the arrival of the counting first signal CLK1 and counts the timing first signal CLK1 for one pulse. At subsequent Step 711, it is decided whether or not the current value of the first timing counter 311 is at 1. The routine transfers to Step 712a, if the current value is at 1, but to Step 712b if the current value other than 1. At Step 712a, the flashing display output FLK is set to the logic level "H" to light the display element 106, and the routine transfers to Step 713. At Step 712b, the flashing display output FLK set at Step 712a is reset, and the routine transfers to Step 713.

At Step 713, it is decided whether or not the current value of the first timing counter 311 is at 10. The routine transfers to Step 715, if the current value is not at 10, but to Step 714 only if the current value is at 10. At Step 714, an additional value $\alpha$ is added to the current value of the second timing counter 312, and the routine then transfers to Step 715.

At Step 715, it is decided whether or not the current value of the first timing counter 311 is at 20. The routine transfers to Step 719a, if the current value is not at 20, but to Step 716 only if the current value is at 20.

At Step 716, the additional value $\Delta$ is added to the current value of the second timing counter 312, and the current value of the first timing counter 311 is reset to 0. Then, the routine transfers to Step 719a.

Subsequent to Step 719a, the routine transfers to Step 717a of FIG. 6. At Step 717a, it is decided whether or not the current value of the second timing counter 312 has reached a target value corresponding the value set by the starting time setting memory 315. The routine returns to Step 603, if the target value is not reached, and the timing action is performed while circulating the operations of Step 603 and Step Block 700a. If Step 717a decides that the target value is reached, the routine transfers to Step 800 of FIG. 8.

In FIG. 7B presenting a flow chart for explaining the actions of the portion of Step Block 700b of FIG. 6, Step 701b is the action start of Step Block 700b of FIG. 6, and the construction from subsequent Step 702 to Step 716 is identical to that of FIG. 7A. Since the main CPU 111a is active, however, Steps 711, 712a and 712b are eliminated so that the flashing display output FLK may not arise.

When the decision of Step 715 is NO so that the current value of the first timing counter 311 is not at 20, Step 717b is activated subsequent to Step 716, to decide whether or not the current value of the second timing counter 312 has reached the target value. When the decision of Step 717b is NO, Step 718 is activated to decide whether or not the exercise releasing command by Step 636b of FIG. 6 has been received. If the releasing command is not received, the routine returns and transfers to Step 702, at which the timing action is continued.

When Step 717b decides the reach to the set value or when Step 718 decides the release of the exercising action, Step 719b is activated, and the routine transfers to Step 614 of FIG. 6. When the exercise release is performed, however, the starting output does not arise at Step 614.

Figure 8:
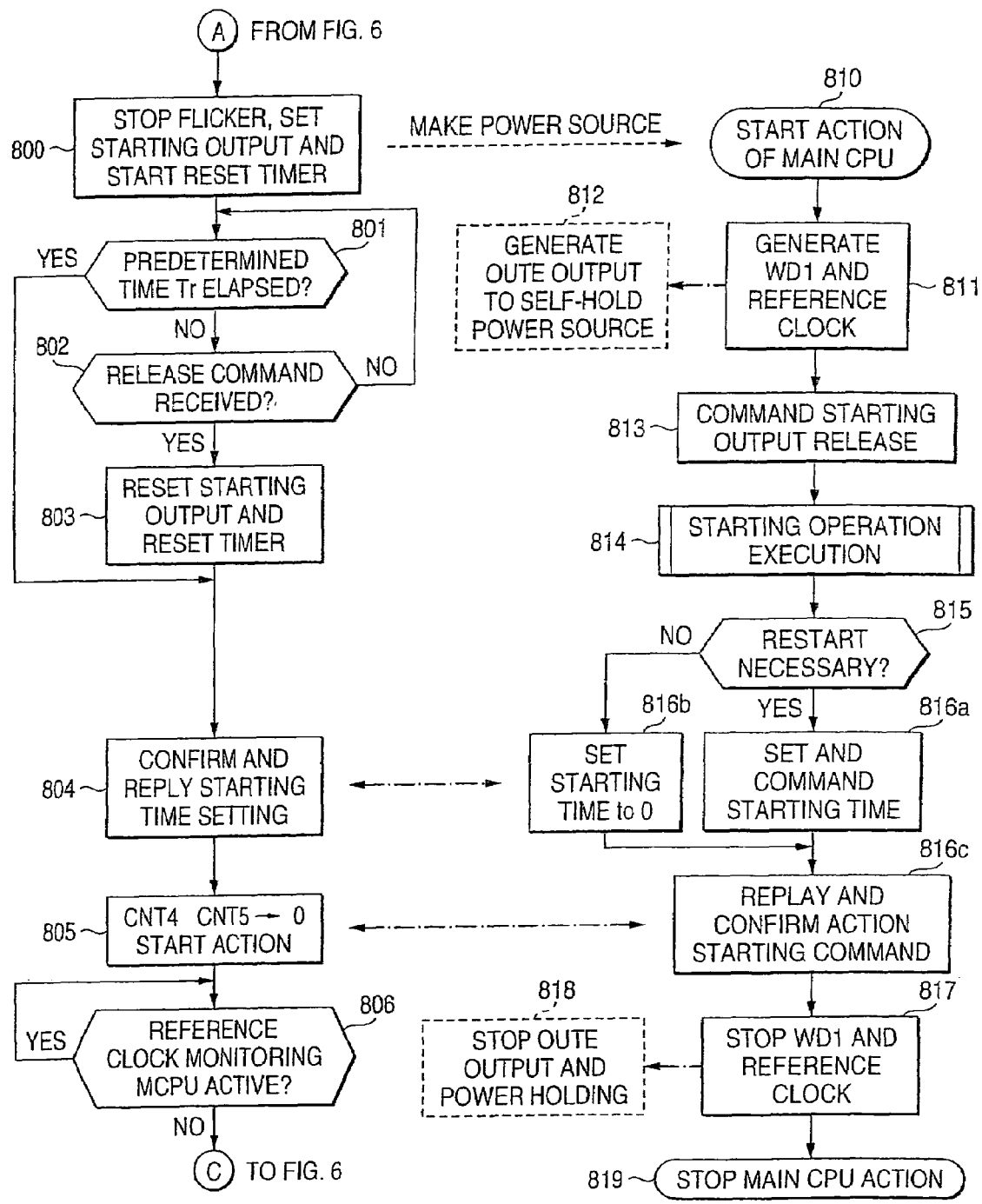
FIG. 8 is a flow chart for explaining the actions of a second half subsequent to the front half of FIG. 6.

In FIG. 8 presenting a flow chart for explaining the actions of the second half of the electronic control device of FIG. 1, Step 800 is activated when the decision of Step 717a of FIG. 6 is the reach to the target value. At Step 800, the flashing display output FLK is stopped, and the starting output signal is generated. Then, the timer corresponding to the reset timer 318 of FIG. 3 is then started.

As a result, the main power source circuit 114a acts to start the action of the main CPU 111a at Step 810 and the generations of the watch dog clear signal WD1 and the correcting reference clock signal CLK0 at subsequent Step 811.

At Step Block 812, as the watch dog clear signal WD1 is generated at Step 811, the watch dog timer circuit 119 generates the output permitting signal OUTE to keep the conduction of the power source relay driving transistor 130. At Step 813 subsequent to Step 811, a reset command of the starting output signal is transmitted to the sub CPU 121a.

At Step 801 to be activated subsequent to Step 800, on the other hand, it is decided whether or not the reset timer started at Step 800 has exceeded the predetermined time Tr. The routine transfers to Step 802, if the predetermined time Tr is not exceeded, but to Step 803 if exceeded.

At Step 802, it is decided whether or not the release command of the starting output transmitted at Step 813 by the main CPU 111a has been received. The routine returns and transfers to Step 801, if not received, but to Step 803, if received, to stop the starting output set at Step 800 and the actions of the reset timer.

At Step block 814 subsequent to Step 813, the main CPU 111a executes predetermined staring operations according to the contents of the first program memory 111b.

At Step 815 to be subsequently activated, it is decided whether or not a restart is necessary. The routine transfers to Step 816a, if the restart is necessary, to confirm transmission and response of the target measurement time. If the restart is unnecessary, the routine transfers to Step 816b, at which the target measurement time 0 is transmitted to confirm the response.

At Step 816c to be activated subsequent to Step 816a or Step 816b, the starting command of the timer measurement action is transmitted, and the reply is confirmed. In case the restart is unnecessary, the starting command is the command for starting the action to generate the flashing display output FLK.

At Step 817 subsequent to Step 816c, the generations of the watch dog clear signal WD1 and the correcting reference clock signal CLK0 are stopped. At Step Block 818, the watch dog timer circuit 119 stops the output permitting signal OUTE so that the main power source circuit 114a is interrupted. At Step 819 subsequent to Step 817, the main CPU 111a stops its actions.

At Step 804 to be activated subsequent to Step 803, the target measurement time commanded at Step 816a or Step 816b is received and stored and is then confirmed and replied. At subsequent Step 805, the current value of the first/second timing counter 311/312 shown in FIG. 3 is reset to 0, and the timing command 302c is generated to start the action of the third counter 123c.

At Step 806 subsequent to Step 805, the correcting reference clock CLK0 is stopped, and the routine then transfers to Step Block 700a of FIG. 6.

The general description will be made on the control flows of FIG. 6 to FIG. 8. In the initial actions in which Step Block 700a acts directly from Steps 600, 601, 602 and 603 of FIG. 6, the counted value N0 at Step 611 is neither measured, nor is set the target measurement time at Step 616. Therefore, the operation of the corrected target value K at Step 705 of FIG. 7A uses the representative value N0 stored at Step 602. At the same time, the adding operation of the second timing counter 312 is not done at Step 714 or Step 716. Therefore, the starting output does not arise, but the flashing action of the display element 106 at Step 712a and Step 712b is exclusively performed.

The exercising action at the time when the power source switch 102 is closed is executed, as shown in FIG. 7B, subsequent to the pseudo starting time commanded at Step 635 of FIG. 6. When the power source switch 102 is interrupted during the exercising action, the exercise release is done at Step 636b, and the normal starting action of Step 640 is started.

In the actions of Step Block 700a of this case, the measurement of the counted value N0 at Step 611 and the setting of the target measurement time at Step 616 are performed. Therefore, the operation of the corrected target value K at Step 705 of FIG. 7A uses the counted value N0 measured, and the adding operation of the second timing counter 312 is performed at Step 714 or Step 716. The starting output signal is generated before long at Step 800 of FIG. 8.

When the starting action is again done, Step Block 700a likewise acts. Without any restart command after the starting operation, however, the target measurement time is set to 0 at Step 816b. Therefore, the added value of FIG. 7A is Δ=0 so that the second timing counter 312 is not subjected to an adding operation at Step 714 or Step 716.

Therefore, no starting output arises, and only the flashing action of the display element 106 is done at Step 712a and Step 712b.

As apparent from the description thus far made, a car-mounted electronic control device 100a according to Embodiment 1 of the invention comprises: a main control circuit unit 110a including a microprocessor to become a main CPU 111a powered by a car-mounted battery 101 through a switching element 104a responding to the action of a power source switch 102 and a main power source circuit 114a, for driving various electric loads 105 in response to the action states of various input sensors 107 and 108 and the contents of a first program memory 111b; and a timer circuit unit 120a powered at all times by the car-mounted battery 101 through an auxiliary power source circuit 124, for measuring the lapse time after the engine was stopped, so that it may generate starting output signals PWP and PWN, when the measured time reaches a predetermined target measurement time, to connect the main power source circuit 114a with the car-mounted battery 101.

The timer circuit unit 120a includes: a microprocessor to become a sub CPU 121a acting synergistically with a second program memory 121b and in synchronism with a high-speed clock signal generated by a first oscillator 122a; timing counters 311 and 312 for counting the number of low-speed clock signals generated by a second oscillator 122b, to measure the lapse time after the main power source circuit 114a was interrupted; a starting time setting memory 315 for storing and memorizing a target measurement time; comparison decision output means 316 for generating starting output signals PWP and PWN when the lapse time corresponding the timed current values of the timing counters 311 and 312 reaches the target measurement time stored into the starting time setting memory 315; first and second estimation means 611 and 705; and periodic correction means 705.

The first estimation means 611 counts the generated pulses of the high-speed clock signal with a first counter 123*a* for a predetermined measurement period T0 of a correcting reference clock CLK0 fed from the main CPU 111*a* to the sub CPU 121*a* when the main CPU 111*a* is active, and measures the generated pulses as a counted value N0, thereby to estimate the period Th of the high-speed clock signal as Th=T0/N0. These condestimation means 705 counts the generated pulses of the high-speed clock signal with a second counter 123*b* for a frequency-divided pulse period T of n times as long as the period Ts of the low-speed clock signal when the main CPU 111*a* is inactive, and measures it as a counted value N, thereby to estimate the pulse period Ts of the low-speed clock signal as Ts=T/n=ThxN/n=T0 (N/N0)/n.

Moreover, the periodic correction means 705 executes the estimation of the pulse period Ts of the low-speed clock signal periodically with the second estimation means 705, and cumulatively corrects the correspondence between the current values of the timing counters 311 and 312 and the timing lapse time in accordance with the value of the pulse period Ts of the low-speed clock signal sequentially updated and estimated.

The sub CPU 121*a* uses a ring oscillator or a semiconductor oscillator, in which the first and second oscillators 122*a* and 122*b* are constructed by connecting an odd number of logically inverted elements in a cascade circulation. The correcting reference clock CLK0 is the highly precise clock signal, which is obtained by frequency-dividing the generated signal of the reference oscillator 112 for driving the main CPU 111*a*. On the contrary, the high-speed clock signal by the first oscillator 122*a* has a pulse period in an intermediate precision, and the low-speed clock signal by the second oscillator 122*b* has a period in a lower precision.

Therefore, the timer circuit unit 120*a* is characterized in that it can be integrated into one small-sized inexpensive integrated circuit element while containing the first and second oscillators 122*a* and 122*b*.

The CPU is generally caused to consume a high electric power by its high-speed actions. However, the electronic control device is characterized: in that the sub CPU 121*a* uses a microprocessor a low power consumption type having a memory of a lower speed and a smaller capacity than that of the main CPU 111*a*; in that it uses the ring oscillator of the first and second oscillators 122*a* and 122*b* or the semiconductor oscillators; and in that the high-speed clock signal of the first oscillator 122*a* can be started/stopped by the timing counter 311 with the pulse period Ts of the low-speed clock signal of the second oscillator 122*b* so that the sub CPU 121*a* by the high-speed clock signal or the first oscillator 122*a* can be intermittently activated to achieve a low power consumption.

Moreover, the sub CPU 121*a* and the main CPU 111*a* are constructed to communicate with each other by the serial communication circuits 111*d* and 121*d* so that the target measurement time to be stored at least in the starting time setting memory 315 is transmitted from the main CPU 111*a* through the serial communication circuits 111*d* and 121*d*. Moreover, the main CPU 111*a* is provided with the monitor input signal MNT and the monitor control means 639.

The monitor input signal MNT is a signal for inputting the starting output signal generated by the timer circuit unit 120*a*, as monitoring information to the main CPU 111*a*. While the power source switch 102 is being closed so that the main CPU 111*a* and the sub CPU 121*a* are electrically powered, the main CPU 111*a* generates the forced action command of the starting output signal through the serial communication circuits 111*d* and 121*d*. The monitor control means 639 inspects the actions of the timer circuit unit 120*a* and the serial communication circuits 111*d* and 121*d* in dependence upon the situations of the action of the monitor input signal MNT upon the forced action command.

Therefore, the electronic control device is characterized in that the actions of the timer circuit unit 120*a* and the serial communication circuits 111*d* and 121*d* can be inspected when the power source switch 102 is closed so that the car-mounted electronic control device 100*a* is used for the operation, thereby to prevent the starting actions from being unreasonably caused by breakages of parts.

Moreover, the forced action commands of the starting output signal are the forced ON/OFF command 633, which is fed from the main CPU 111*a* through the serial communication circuits 111*d* and 121*d* to the timer circuit unit 120*a* thereby to turn ON or OFF the starting output signal to be generated by the timer circuit unit 120*a*, forcibly. The starting output signal is provided with one pair of positive and negative output signals PWP and PWN having contrary logic levels of positive and negative polarities.

Therefore, the electronic control device is characterized in that the starting actions can be prevented, by leaving it inactive unless both the paired starting output signals PWP and PWN become abnormal, from being unreasonably caused by the breakage of parts of the output unit.

The forced action command of the starting output signal is the operation action starting command 636, which is fed from the main CPU 111*a* through the serial communication circuits hid and 121*d* to the timer circuit unit 120*a* thereby to promote the generation of the starting output signal based on the simulation target measurement time. Therefore, the electronic control device is characterized in that the starting action can be prevented from being unreasonably caused by the breakage of more related parts, by performing the action inspection including the timing action of the starting time.

Moreover, the timer circuit unit 120*a* is means further including corrected target value operation means 310 to be operated by the sub CPU 121*a*, and a third counter 123*c* disposed outside of the sub CPU 121*a*. The corrected target value operation means 310 calculates a target value of K=τ0/Ts so that the product of the pulse period Ts and the corrected target value K may be the timing unit time τ0 at all times, even if the pulse period Ts of the low-speed clock signal might fluctuate. Moreover, the third counter 123*c* counts the low-speed clock signal to reset the current value each time the counted current value reaches the corrected target value K, and generates a timing first signal CLK1 having a first period of the timing unit time τ0 to repeat the counting of the low-speed clock signal again. The timing counters 311 and 312 count the time-calibrated timing first signal CLK1 to attain the current value proportional to the lapse time from the counting start.

Therefore, the electronic control device is characterized in that the target starting time can be acquired by counting the timing first signal CLK1 or the highly precise clock signal, which is not adversely affected by the individual dispersion fluctuation of the high-speed clock signal period Th, the individual dispersion fluctuation of the low-speed clock signal pulse period and the environmental temperature fluctuation, with the timing counters 311 and 312.

The timer circuit unit 120*a* further includes high-speed clock stopping means 307. This high-speed clock stopping means 307 is means for stopping the first oscillator 122*a* when the current value of the third counter 123*c* is other than a predetermined value, thereby to stop the action of the sub CPU 121*a*. For the period while the current value of the third counter 123*c* is within the range of the predetermined value so that the high-speed clock signal is effective, the counting actions of the timing counters 311 and 312 and the second estimation means 705 become periodically active.

The electronic control device is characterized in that, after the power source switch 102 was opened to stop the main CPU 111a, therefore, the high-speed clock signal is intermittently generated to run the sub CPU 121a so that only the counting action of the low-speed clock signal by the third counter 123c can be performed for most time bands thereby to provide a starting timer circuit of low power consumption.

In the timer circuit unit 120a, the timing counter is divided into the first and second timing counters 311 and 312. The first timing counter 311 is a frequency dividing counter for counting the counting first signal CLK1 to generate a timing second signal CLK2 each time the counted value reaches a predetermined value. The second timing counter 312 counts the timing second signal CLK2 so that the comparison decision output means 316 outputs a starting output signal when the counted value becomes a value corresponding to the target measurement time stored in a starting time setting memory 315. The second estimation means 705 acts each time the timing second signal CLK2 arises.

Therefore, the electronic control device is characterized in that long and short starting times of various specifications can be obtained with the cascade-connected second timing counter 312 by changing the counted value of the first timing counter 311 to vary the period of the timing second signal CLK2.

The timer circuit unit 120a further includes a display element 106 connected with the outside, and flashing display output means 314 for driving the display element 106 to flash. The flashing display output means 314 is ON/OFF ratio control means for driving the display element 106 to flash, when the counted current value of the first timing counter 311 is within the range of a predetermined value, and for stopping the drive of the display element 106 when the counted current value of the first timing counter 311 is at a value other than the predetermined one. The display element 106 is disposed at such a position as can be visually recognized at least by the driver of the vehicle, thereby to display it visually that the timer circuit unit 120a is active.

Therefore, the electronic control device is characterized in that it can notify the active state of the start even after the power source switch 102 is interrupted, and can easily change the flashing ratio of the flashing action for reducing the power consumption.

The display element 106 is disposed at such a position as can also be visually recognized from the outside of the vehicle, so that it acts as warning display means for preventing a parked vehicle from being stolen.

Therefore, the electronic control device is characterized in that the timer circuit unit 120a can use the display element indicating the action mode, as the steal preventing warning display element thereby to suppress the increase in the power consumption.

The switching element 104a interposed between the car-mounted battery 101 and the main power source circuit 114a is the output contact of a power source relay, in which the electromagnetic oil 103a is closed with the logical add output of the first, second and third drive signals. The first drive signal is made effective or ineffective, responsively as the power source switch 102 closed at the operation time of the vehicle is made or interrupted.

Moreover, the second drive signal is either an output permitting signal OUTE, which is effective when the generation period of the watch dog clear signal WD1 to be generated by the main CPU 111a is a predetermined time or shorter, or a self-holding drive signal DR to be generated by the main CPU 111a.

Moreover, the third drive signal is a starting output signal PWP/PWN generated by the sub CPU 121a. After the main CPU 111a was started with the third drive signal, the output of the starting output signal PWP/PWN is stopped, the closing action of the switching element 104a is held with the second drive signal in place of the third drive signal, or the third drive signal is continuously generated but its output is stopped by the main CPU 111a as the starting operation ends.

Therefore, the electronic control device is characterized: in that even after the power source switch 102 was interrupted, therefore, the main CPU 111a is enabled by the second drive signal to act for preparing the starting control; and in that it can be controlled for the starting operation period accompanying the generation of the starting output signal PWP/PWN so that the power of the car-mounted battery 101 can be spared by interrupting the main power source circuit 114a immediately after the start preparing operation or the starting operation ends.

Embodiment 2 of the Invention

Figure 9:
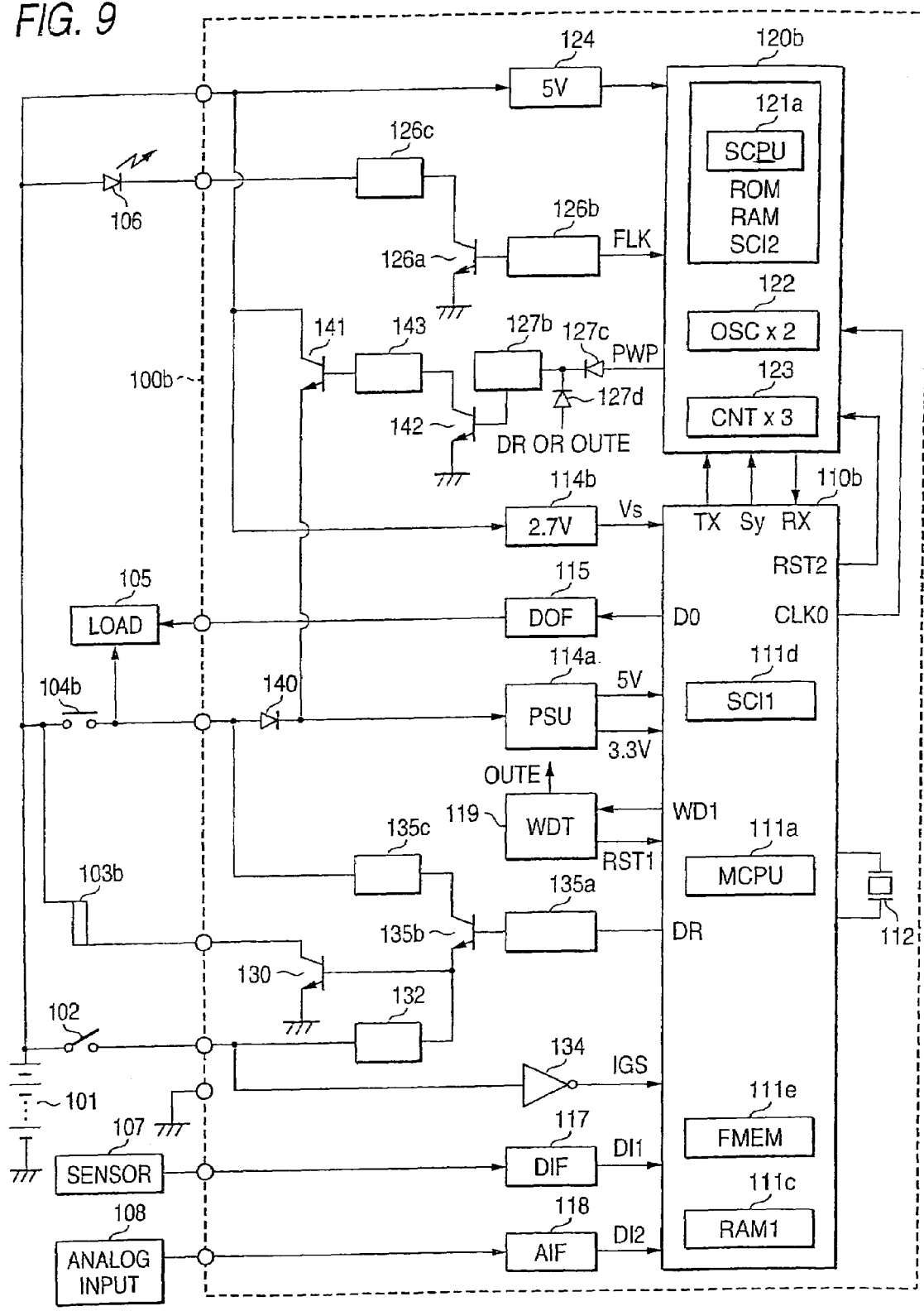
FIG. 9 is an entire construction diagram of an electronic control device according to a second embodiment of the invention.

FIG. 9 presenting the entire construction diagram of an electronic control device according to the second embodiment of the invention will be described in a manner to centralize the points different from those of FIG. 1.

In FIG. 9, a car-mounted electronic control device 100b is mainly constructed of a main control circuit unit 10b and a timer circuit unit 120b, and is housed in the not-shown sealed housing.

At first, an output contact 104b of a power source relay having an electromagnetic coil 103b is connected with the main power source circuit 114a through a reverse current blocking diode 140, thus constructing a first feed circuit from the car-mounted battery 101.

The main control circuit unit 110b is constructed to include a first program memory 111e of an on volatile flash memory associated with the main CPU 111a, an operation processing RAM memory 111c, and a series-parallel converter 111d, and generates a self-holding drive signal DR in accordance with the operation start of the main CPU 111a.

The transistor 130 for energizing the electromagnetic coil 103b is rendered conductive through a drive resistor 132, when the power source switch 102 is closed. While the main CPU 111a is active, a transistor 135b is rendered conductive and driven through a base resistor 135a with the self-holding drive signal DR so that the transistor 130 is held conductive with a drive resistor 135c and the transistor 135b.

Figure 10:
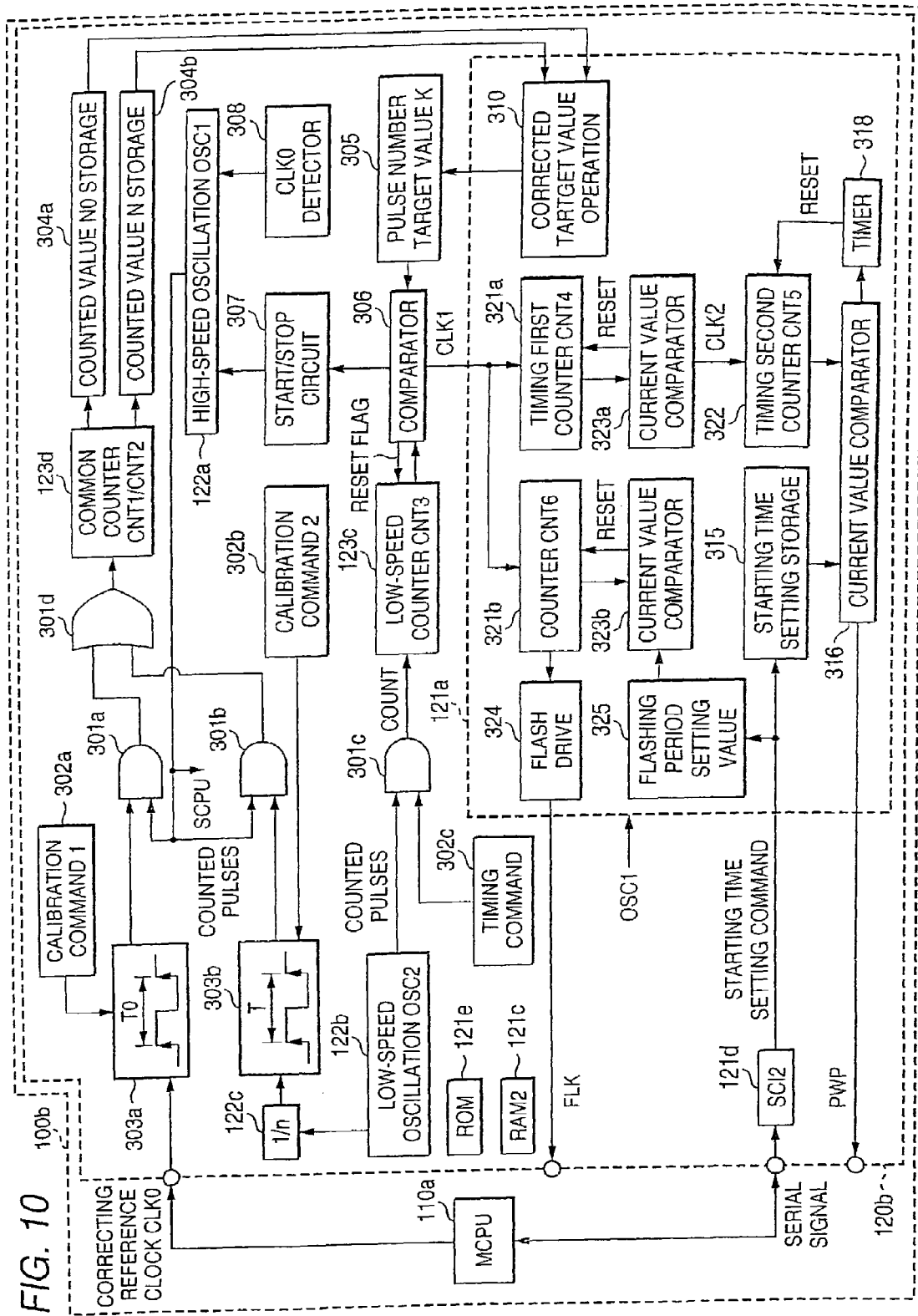
FIG. 10 is a control block diagram of a timer circuit unit of the device of FIG. 9.

As shown in detail in FIG. 10, the timer circuit unit 120b is constructed to include the sub CPU 121a of low speed and low power consumption, two high- and low-speed oscillators 122 composed of ring oscillators, and three hardware counters 123. The timer circuit unit 120b generates the starting output signal PWP when a predetermined target measurement time elapses after the output contact 104b acting as the first switching element is opened.

A transistor 141 or a second switching element is connected between the car-mounted battery 101 and the main power source circuit 114a so that the transistor 141 is rendered conductive and driven through a drive resistor 143 when a transistor 142 disposed in the base circuit becomes conductive.

The transistor 142 is rendered conductive and driven from the starting drive output PWP through a series circuit of a diode 127c and a drive resistor 127b, and is rendered and held conductive from the self-holding drive output DR of the main CPU 111a through a series circuit of a diode 127d and the drive resistor 127b.

Here, the self-holding drive output DR for rendering and holding the transistor 135b and the transistor 142 conductive can also be replaced by the output permitting signal OUTE, which is generated by the watch dog timer circuit 119 when the watch dog clear signal WD1 or the pulse train generated by the main CPU 111a has a pulse width at a predetermined value or less.

Moreover, the drive of the transistor 142 with the self-holding drive signal DR or the output permitting signal OUTE is not needed if the sub CPU 121a generates the starting output signal PWP continuously and if the generation of that starting output signal is stopped by the main CPU 111a as the starting operation ends.

FIG. 10 presenting a control block diagram of the timer circuit unit of FIG. 9 will be described on the points different from those of FIG. 3.

In FIG. 10, the sub CPU 121a to be used in the timer circuit unit 120b acts synergistically with a second program memory 121e or a nonvolatile memory such as a mask ROM memory and in synchronism with the high-speed clock signal generated by the first oscillator 122a. The sub CPU 121a performs the operation processing with the second RAM memory 121c therefor, and communicates with the main CPU 111a through a series-parallel converter 121d constructing the serial communication circuit.

A first timing counter 321a counts the timing first signal CLK1 having a first period of τ0 such as 0.1 seconds, thereby to generate a timing second signal CLK2 having a second period of τ such as one minute. Current value comparing means 323a generates the timing second signal CLK2, when the first timing counter 321a takes a current value of 600, for example, and resets the current value of the first timing counter 321a to 0.

A second timing counter 322 counts the timing second signal CLK2 and issues the starting output signal PWP through the comparison decision output means 316 when its current value takes a value corresponding to the time stored in the starting time setting memory 315.

Here, the starting time to be stored in the starting time setting memory 315 is a direct target value such as 5 hours and 30 minutes, where as the value to be compared by the comparison decision output means 316 is converted into the timing unit such as 19,800 seconds of the second timing counter 322.

However, the value itself of the target measurement time transmitted from the main CPU 111a can also be converted into the timing unit of the second timing counter 322.

A ring counter 321b counts the timing first signal CLK1 having a first period of τ0 of 0.1 seconds, and current value comparing means 323b resets the current value of the ring counter 321b to 0, at each time the current value of the ring counter 321b reaches a value such as 20 set by a flashing period setting memory 325.

Flashing drive display output means 324 generates the flashing display output signal FLK when the current value of the ring counter is within the range of a predetermined value.

Therefore, the flashing period of the display element 106 can be freely changed either by changing the set value of the flashing period setting memory 325 or by selectively using the set memory stored with various set values.

A logical add element 301d for entering the outputs of the gate elements 301a and 301b is connected with the counting input circuit of a common counter 123d. The counted value N0 based on the calibration command 302a is stored in the measured value storage memory 304a, and the counted value N based on the calibration command 302b is stored in the measured value storage memory 304b. The calibration commands 302a and 302b are not simultaneously generated.

The first half actions and the second half actions of the electronic control device of FIG. 9 are identical to those of FIG. 1, as shown in FIG. 6 and FIG. 8.

However, the first and second timing counters 311 and 312 are replaced by the counters 321a and 322, and the first and second counters 123a and 123b are replaced by the common counter 123d. Step Blocks 700a and 700b shown in FIG. 6, FIG. 7A and FIG. 7B are replaced by those shown in FIG. 11A and FIG. 11B.

Figure 11A:
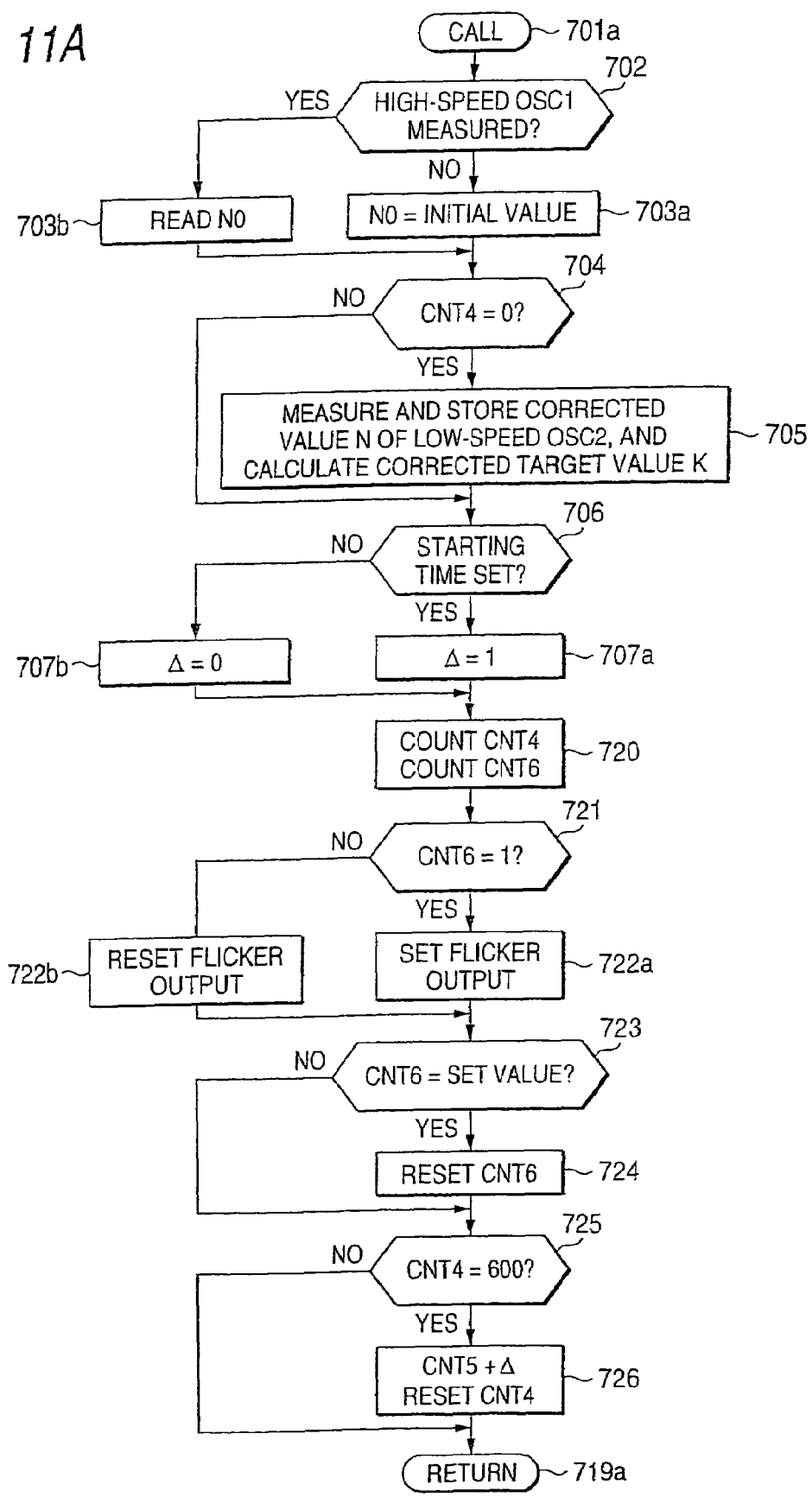
FIGS. 11A and 11B are flow charts for explaining the partial actions of FIG. 9.

In FIG. 11A presenting a flow chart for explaining the operations of the portion on Step Block 700a of FIG. 6, at Step 701a, the actions of Step Block 700a of FIG. 6 are started. At subsequent Step 702, it is decided whether or not the counted value N0 has already been measured at Step 611. The routine transfers to Step 703a, if the measurement is not completed, but to Step 703b, if the measurement is completed.

At Step 703a, the initial value set at Step 602 is read as the counted value N0. At Step 703b, the actually measured value, which was measured at Step 611 and stored in the measured value storage memory 304a, is read as the measured value N0.

Step 704 is activated subsequent to Step 703a or Step 703b, to decide whether or not the current value of the first timing counter 321a is at 0. The routine transfers to Step 706, if the current value is not at 0, but to Step 705 only if the current value is at 0.

At Step 705, the second calibration command 302b in FIG. 10 is generated so that the common counter 123d counts the counted value N. When this value is stored in the counted value storage memory 304b, the corrected target value K is calculated on the basis of Formula (3) in FIG. 4C, and is stored in the pulse target value storage memory 305. After this, the routine transfers to Step 706.

At Step 706, it is decided whether or not the starting time setting memory 315 is set with a numerical value other than the initial value 0. The routine transfers to Step 707a, at which the added value of Δ=1 is stored, if set, but to Step 707b, at which the added value of Δ=0 is stored, if not yet.

Here, the added values are used to determine whether or not the second timing counter 322 is to perform the addition, and no adding action is performed if the added value is 0.

Subsequent to Step 707a or Step 707b, Step 720 is activated for the first timing counter 321a and the ring counter 321b to count the timing first signal CLK1 for one pulse while awaiting the arrival of the timing first signal CLK1. At subsequent Step 721, it is decided whether or not the current value of the ring counter 321b is at 1. The routine transfers to Step 722a, if the current value is at 1, but to Step 722b if the current value is other than 1.

At Step 722a, the flashing display output FLK is set to the logic level "H" to light the display element 106 and the routine transfers to Step 723. At Step 722b, the flashing display output FLK set at Step 722a is reset, and the routine transfers to Step 723. At Step 723, it is decided whether or not the current value of the ring counter 321b is a target value Nmax stored in the flashing period setting memory 325. The routine transfers to Step 725, if not the target value Nmax, but to Step 724 only if the current value is at the target value Nmax. At Step 724, the current value of a ring counter 721b is reset to 0, and the routine transfers to Step 725.

At Step 725, it is decided whether or not the current value of a first timing counter 721a is at 600. The routine transfers to Step 719a, if the current value is not at 600, but to Step 726 only if the current value is at 600.

At Step 726, the added value A is added to the current value of the second timing counter 322, and the current value of the first timing counter 321a is reset to 0. After this, the routine transfers to Step 719a.

Subsequent to Step 719a, the routine transfers to Step 717a of FIG. 6, at which it is decided whether or not the current value of the second timing counter 322 becomes the target value corresponding to the value set by the starting time setting memory 315. The routine returns and transfers to Step 603, if the target value is not reached, and the timing actions are performed while circulating Step 603 and Step Block 700a. If Step 717a decides that the target value is reached, the routine transfers to Step 800 of FIG. 8.

Figure 11B:
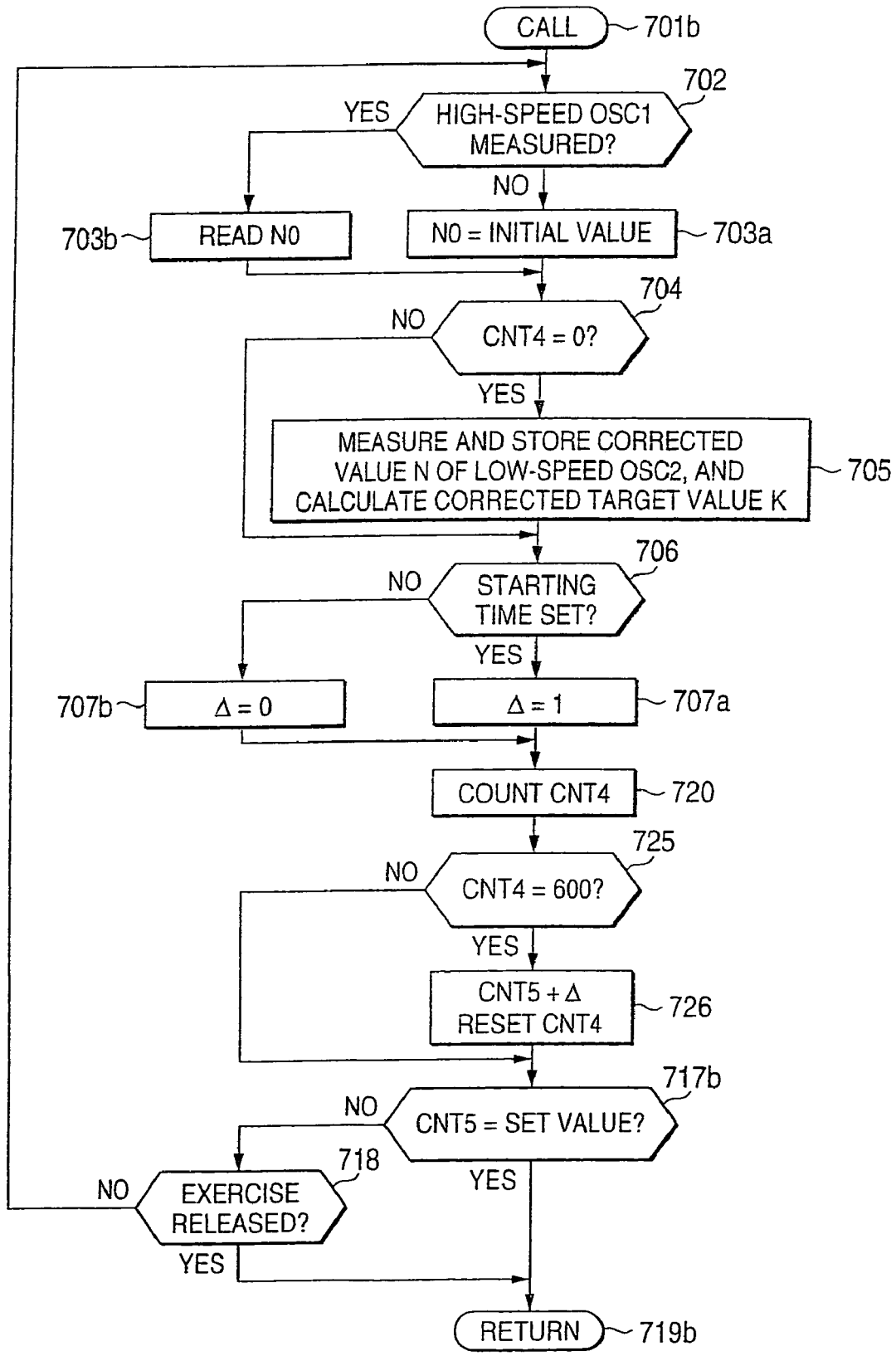

In FIG. 11B presenting a flow chart for explaining the operations of the portion on Step Block 700b of FIG. 6, at Step 701b, the actions of Step Block 700b of FIG. 6 are started. Operations of subsequent Step 702 to Step 726 are identical to those of FIG. 7A.

Since the main CPU 111a is active, however, the operations from Step 721 to Step 724 are so eliminated that the flashing display output FLK may not arise. At Step 720, the counting by the ring counter 321b is not done. Step 717b is activated either when the decision of Step 725 is NO so that the current value of the first timing counter 321a is not at 600 1418 or subsequent to Step 726, thereby to decide whether or not the current value of the second timing counter 322 has reached the target value. Step 718 is activated when Step 717b decides that the target value is not reached, thereby to decide whether or not the exercise releasing command has been received at Step 636b of FIG. 6. If the releasing command is not received, the routine returns and transfers to Step 702, at which the timing action is continued.

Step 719b is activated when the decision of Step 717b is the arrival at the set value or when the decision of Step 718 is the exercise action release, and the routine transfers to Step 614 of FIG. 6.

However, the starting output is not generated at Step 614 when the exercise release was made.

As apparent from the description thus far made, a car-mounted electronic control device 100b according to Embodiment 2 of the invention comprises: a main control circuit unit 10b including a microprocessor to become a main CPU 111a powered by a car-mounted battery 101 through a switching element 104b responding to the action of a power source switch 102 and a main power source circuit 114a, for driving various electric loads 105 in response to the action states of various input sensors 107 and 108 and the contents of a first program memory 111e; and a timer circuit unit 120b powered at all times by the car-mounted battery 101 through an auxiliary power source circuit 124, for measuring the time, for which the main power source circuit 114a is interrupted, so that it may generate a starting output signal PWP, when the measured time reaches a predetermined target measurement time, to connect the main power source 114a with the car-mounted battery 101.

The timer circuit unit 120b includes: a microprocessor to become a sub CPU 121a acting synergistically with a second program memory 121e and in synchronism with a high-speed clock signal generated by a first oscillator 122a; timing counters 321a and 322 for counting the number of low-speed clock signals generated by a second oscillator 122b, to measure the lapse time after the main power source circuit 114a was interrupted; a starting time setting memory 315 for storing and memorizing a target measurement time; comparison decision output means 316 for generating starting output signal PWP when the lapse time corresponding the timed current values of the timing counters 321a and 322; first and second estimation means 611 and 705; and periodic correction means 705.

The first estimation means 611 counts the generated pulses of the high-speed clock signal with a common counter 123d for a predetermined measurement period T0 of a correcting reference clock CLK0 fed from the main CPU 111a to the sub CPU 121a when the main CPU 111a is active, and measures the generated pulses as a counted value N0, thereby to estimate the period Th of the high-speed clock signal as Th=T0/N0.

The second estimation means 705 counts the generated pulses of the high-speed clock signal with a common counter 123d for a frequency-divided pulse period T of n times as long as the period Ts of the low-speed clock signal when the main CPU 111a is inactive, and measures it as a counted value N, thereby to estimate the pulse period Ts of the low-speed clock signal as Ts=T/n=Th×N/n=T0(N/N0)/n.

Moreover, the periodic correction means 705 executes the estimation of the pulse period Ts of the low-speed clock signal periodically with the second estimation means 705, and cumulatively corrects the correspondence between the current values of the timing counters 321a and 322 and the timing lapse time in accordance with the value of the pulse period Ts of the low-speed clock signal sequentially updated and estimated.

The timer circuit unit 120b further includes the corrected target value operation means 310 to be operated by the sub CPU 121a, and the third counter 123c disposed outside of the sub CPU 121a. The corrected target value operation means 310 calculates the target value of K=τ0/Ts so that the product of the period Ts and the corrected target value K may always be the timing unit time τ0, even if the period Ts of the low-speed clock signal should fluctuate.

Moreover, the third counter 123c counts the low-speed clock signal to reset the current value each time the counted current value reaches the corrected target value K, and generates the timing first signal CLK1 for the first period of the timing unit time τ0 thereby to repeat the counting of the low-speed clock signal again. The timing counters 321a and 322 count the time-calibrated timing first signal CLK1 to achieve the current value proportional to the lapse time from the counting start.

The timer circuit unit 120b further includes the high-speed clock stopping means 307. This high-speed clock stopping means 307 stops the first oscillator 122a to stop the action of the sub CPU 121a, when the current value of the third counter 123c is other than a predetermined value. While the current value of the third counter 123c is within the predetermined value so that the high-speed clock signal is active, the counting actions of the timing counters 321a and 322 and the second estimation means 705 are periodically activated.

In the timer circuit unit 120b, the timing counter is divided into the first and second timing counters 321a and 322. The first timing counter 321a is a frequency dividing counter for counting the timing first signal CLK1 to generate the timing second signal CLK2 each time the counted value reaches the predetermined value. The second timing counter 322 counts the timing second signal CLK2, so that the comparison decision output means 316 generates the starting output signal PWP when the counted value becomes the value corresponding to the target measurement time stored in the starting time setting memory 315. The second estimation means 705 acts at each generation of the timing second signal CLK2.

The timer circuit unit 120*b* further includes the display element 106 connected with the outside, the flashing display output means 324 for driving the display element 106 to flash, and the flashing period setting memory 325. The flashing display output means 324 is the ON/OFF ratio control means for counting the timing first signal CLK1 to drive the display element 106 when the current value of the ring counter 321*b* to be reset with the current value when the counted value becomes the set value stored in the flashing period setting memory 325 is at a predetermined value.

For the set value of the flashing period to be stored in the flashing period setting memory 325, moreover, there are selectively used a plurality of memories, in which set values different depending on whether or not at least the sub CPU 121*a* is in the mode for the starting operation are rewritten and stored, or in which different set values are stored. The display element 106 is disposed at such a position as can be visually recognized at least by the driver of the vehicle, so that it may visually display whether or not the timer circuit unit 120*b* is active.

Therefore, the electronic control device is characterized in that it can notify the active state of the start even after the power source switch 102 is interrupted, and can easily change the flashing ratio of the flashing action for reducing the power consumption.

The electronic control device is further characterized in that it can discriminate whether or not the mode is in the starting action.

The common counter 123*d* is used for the first and second counters disposed in the timer circuit unit 120*b*, so that the measurement of the period of the correcting reference clock signal CLK0 to be fed from the main CPU 111*a* and the measurement of the pulse period of the low-speed clock signal generated by the timer circuit unit 120*b* according to the second oscillator 122*b* are executed at different timings.

Therefore, the electronic control device is characterized in that a small-sized inexpensive timer circuit unit 120*b* can be obtained.

The car-mounted electronic control device 100*b* further includes first and second power feeding circuits.

The first power feeding circuit includes the power source relay having the output contact for the first switching element 104*b* connected between the main power source circuit 114*a* and the various electric loads 105 and the car-mounted battery 101, and the electromagnetic coil 103*b* closed circuit-driving the output contact, and a reverse flow blocking diode 140 connected in series with the output contact. The electromagnetic coil 103*b* is a power feeding circuit, which is biased when the power source switch 102 to be operated at the vehicle operation time is closed and which is held in action with either the output permitting signal OUTE to become effective when the generation period of the watch dog clear signal WD1 generated by the main CPU 111*a* is a predetermined time or shorter or the self-holding drive signal DR to be generated by the main CPU 111*a*.

The second power feeding circuit includes the second switching element 141 for connecting the main power source circuit 114*a* and the car-mounted battery 101. The second switching element 141 is closed when the starting output signal PWP arises, is kept closed by any of the first, second and third closure continuing means, and is opened when the closure continuing means becomes inactive.

Here, the first closure connecting means causes the timer circuit unit 120*b* to continue the starting output signal PWP till the stop command comes from the main CPU 111*a* started. The second closure continuing means is replaced by the self-holding drive signal DR generated by the main CPU 111*a* after the start. The third closure continuing means is replaced by the output permitting signal OUTE, which is effective when the generation period of the watch dog clear signal WD1 generated by the main CPU 111*a* after the start is a predetermined time or shorter.

Moreover, the reverse flow blocking diode 140 is connected in a relation to permit the power feed from the first power feeding circuit to the various electric loads 105 but to block the power feed from the second power feeding circuit to the various electric loads 105.

Therefore, the electronic control device is characterized in that even after the power source switch 102 was interrupted, the main CPU 111*a* is enabled by the second drive signal to act preparations for the starting control and can be controlled by the main CPU 111*a* for the starting operation period accompanying the generation of the starting output signal PWP, so that the power of the car-mounted battery 101 can be spared by interrupting the main power source circuit 114*a* instantly after the end of the start preparing operation or the starting operation.

The electronic control device is further characterized in that the first switching element 104*b* is opened at the starting operation time so that the power is not fed to the various electric loads 105 connected with the first switching element 104*b* thereby to prevent any unnecessary increase in the power consumption.

What is claimed is:

1. A car-mounted electronic control device comprising: a main control circuit unit including a microprocessor to become a main CPU powered by a car-mounted battery through a switching clement responding to an action of a power source switch and a main power source circuit, for driving various electric loads in response to action states of various input sensors and contents of a first program memory; and a timer circuit unit powered at all times by the car-mounted battery through an auxiliary power source circuit, for measuring a lapse of time from a time measurement starting command of the main CPU, so as to generate a starting output signal, when a predetermined target measurement time is reached, and to feed the main power source circuit with the car-mounted battery thereby to start and activate said main CPU, wherein said timer circuit unit includes:

a microprocessor to become a sub CPU acting synergistically with a second program memory and in synchronism with a high-speed clock signal generated by a first oscillator;

timing counters for counting a number of low-speed clock signals generated by a second oscillator, to measure the lapse of time after said main power source circuit is interrupted;

first estimation means for estimating a pulse period of said high-speed clock signal by receiving a correcting reference clock having a period divided or multiplied from a reference oscillator output signal for driving said main CPU, when said main CPU is active, and by counting generated pulses of said high-speed clock signal with a first counter of the timing counters for a predetermined measurement period of said correcting reference clock;

second estimation means for estimating a period of said low-speed clock signals by counting generated pulses of said high-speed clock signal with a second counter of the timing counters for a frequency-divided pulse period of said low-speed clock signals when said main CPU is inactive; and periodic correction means for cumulatively correcting current values of said timing counters and the lapse of time obtained by the timing counters in accordance with the period of the low-speed clock signals sequentially updated and estimated by executing the period estimation of the low-speed clock signals periodically with said second estimation means.

2. The car-mounted electronic control device according to claim 1,
wherein said sub CPU includes: the microprocessor having a memory of a lower speed and a smaller capacity than that of the main CPU; and said first and second oscillators being ring oscillators or semiconductor oscillators, and
wherein the high-speed clock signal of said first oscillator can be started/stopped by said first timing counter so that said sub CPU can be intermittently activated by the high-speed clock signal or the first oscillator.

3. The car-mounted electronic control device according to claim 1,
wherein the sub CPU and the main CPU are connected by serial communication circuits so that the target measurement time to be stored at least in a starting time setting memory is transmitted from the main CPU through the serial communication circuits and so that the main CPU can inspect a situation of the sub CPU with contents replied from the sub CPU,
wherein the main CPU includes a monitor input signal and monitor control means,
wherein said monitor input signal is a signal for inputting the starting output signal generated by the timer circuit unit, as monitoring information to the main CPU, and
wherein said monitor control means inspects actions of the timer circuit unit and the serial communication circuits in dependence upon situations of an action of the monitor input signal upon a forced action command of the starting output signal, when the main CPU is active to generate said forced action command through the serial communication circuits.

4. The car-mounted electronic control device according to claim 1,
wherein the starting output signal generated by said timer circuit unit is composed of a pair of positive and negative output signals having contrary positive and negative logic levels.

5. The car-mounted electronic control device according to claim 3,
wherein the forced action command of said starting output signal is fed from the main CPU through the serial communication circuits to the timer circuit unit to make an exercise action possible to promote generation of the starting output signal based on a simulated target measurement time from the main CPU.

6. The car-mounted electronic control device according to claim 1,
wherein said timer circuit unit further includes corrected target value operation means to be operated by the sub CPU, and a third counter of the timing counters disposed outside of the sub CPU,
wherein said corrected target value operation means makes such calculations that a product of the pulse period of the low-speed clock signals of the second oscillator and a corrected target value may be a constant timing unit time at all times, even if the pulse period of the low-speed clock signals of the second oscillator might fluctuate,
wherein said third counter counts the pulse period of the low-speed clock signals of the second oscillator, and generates a timing unit signal having a first period of the timing unit time to repeat the counting of the low-speed clock signals again, and
wherein said timing counters count the timing unit signal to attain the current value proportional to the lapse time from the counting stan.

7. The car-mounted electronic control device according to claim 6,
wherein said timer circuit unit further includes high-speed clock stopping means, and
wherein the high-speed clock stopping means stops the first oscillator when a current value of the third counter is other than a predetermined value, thereby to stop an action of the sub CPU, whereby for the period while the current value of the third counter is within the range of the predetermined value, so that the high-speed clock thereby to stop an action of the sub CPU, whereby for the period while the current value of the third counter is within the range of the predetermined value so that the high-speed clock signal is effective, counting actions of the timing counters and the second estimation means become periodically active.

8. The car-mounted electronic control device according to claim 1,
wherein said timing counters in the timer circuit unit, are divided into the first and second timing counters,
wherein said first timing counter is a frequency dividing counter for counting a timing first signal to generate a timing second signal each time a counted value reaches a predetermined value,
wherein said second timing counter counts said timing second signal so that a comparison decision output means outputs the starting output signal when said counted value becomes a value corresponding to the target measurement time stored in a measurement time setting memory, and
wherein said second estimation means acts each time the timing second signal arises.

9. The car-mounted electronic control device according to claim 8,
wherein said timer circuit unit further includes a display element connected with the outside, and flashing display output means for driving said display element to flash,
wherein said flashing display output means is ON/OFF ratio control means for driving the display element to flash, when a counted current value of the first timing counter is within the range of a predetermined value, and for stopping the drive of the display element when the counted current value of said first timing counter is at a value other than a predetermined one, and
wherein said display element is disposed at least at a visually recognizable position thereby to display that the timer circuit unit is active.

10. The car-mounted electronic control device according to claim 1,
wherein said timer circuit unit further includes: a display element connected with the outside; flashing display output means for driving said display element to flash; and a flashing period setting memory,
wherein said flashing display output means is ON/OFF ratio control means connected with a ring counter, which counts a timing first signal and which is reset with a current value when a counted value becomes a set value stored in the flashing period setting memory, thereby to drive the display element when the current value of said ring counter is at a predetermined value, and wherein for the set value of the flashing period to be stored in said flashing period setting memory, there are selectively used a plurality of memories, in which set values different depending on whether or not at least the sub CPU is in the mode for the starting operation are rewritten and stored, or in which different set values are stored.

11. The car-mounted electronic control device according to claim 9, wherein said display element is disposed at the visually recognizable position so that it may act as warning display means for preventing a steal.

12. The car-mounted electronic control device according to claim 1, wherein the first and second counters disposed in said timer circuit unit are provided in the form of a common counter, and wherein a measurement of a pulse period of the correcting reference clock signal to be fed from said main CPU and the estimation of the pulse period of the low-speed clock signals generated by the timer circuit unit according to the second oscillator are executed at different timings.

13. The car-mounted electronic control device according to claim 1, wherein the switching element interposed between the battery and the main power source circuit is an output contact of a power source relay, in which an electromagnetic coil is closed with a logical add output of first, second and third drive signals, wherein the first drive signal is made effective or ineffective, in response to the closure or interruption of the power source switch, wherein the second drive signal is either an output permitting signal, which is effective when the generation period of a watch dog clear signal to be generated by the main CPU is a predetermined time or shorter, or a self-holding drive signal to be generated by the main CPU, wherein the third drive signal is the starting output signal and which is generated by the sub CPU, and wherein after the main CPU was started with the third drive signal, a) the output of the starting output signal is stopped, b) the closing action of the switching element is held with the second drive signal in place of the third drive signal, or c) the third drive signal is continuously generated but its output is stopped by the main CPU as the starting operation ends.

14. The car-mounted electronic control device according to claim 1, further comprising: first and second power feeding circuits interposed between the battery and the main power source circuit, wherein the first power feeding circuit includes: a power source relay having an output contact wherein the switching element is a first switching element connected between the main power source circuit and the various electric loads and the battery, and an electromagnetic coil to make the output contact close; and a reverse flow blocking diode connected in series with the output contact, wherein the electromagnetic coil is a power feeding circuit, which is biased when the power source switch is closed and which is held in action with either an output permitting signal to become effective when a generation period of a watch dog clear signal generated by the main CPU is a predetermined time or shorter, or a self-holding drive signal to be generated by the main CPU, wherein the second power feeding circuit includes a second switching element for connecting the main power source circuit and the battery, such that the second switching element is to be closed when the starting output signal arises, and is kept closed by any of first, second and third closure continuing means, and is opened when said any of the first, second and third closure continuing means becomes inactive, wherein the first closure continuing means causes the timer circuit unit to continue the starting output signal till a stop command indicates that the main CPU is started, wherein the second closure continuing means is replaced by the self-holding drive signal generated by the main CPU after the main CPU is started, wherein the third closure continuing means is replaced by the output permitting signal, which is effective when the generation period of the watch dog clear signal generated by the main CPU alter the start of the main CPU is the predetermined time or shorter, and wherein the reverse flow blocking diode is connected to permit the power feed from the first power feeding circuit to the various electric loads but to block the power feed from the second power feeding circuit to the various electric loads.

* * * * *